US012737753B2

(12) United States Patent
Trevethan

(10) Patent No.: US 12,737,753 B2

(45) **Date of Patent: *Sep. 15, 2026**

(54) COMPUTER-IMPLEMENTED SYSTEM AND METHOD FOR TRUSTLESS ZERO-KNOWLEDGE CONTINGENT PAYMENT

(71) Applicant: nChain Licensing AG, Zug (CH)

(72) Inventor: Thomas Trevethan, London (GB)

(73) Assignee: nChain Licensing AG, Zug (CH)

( * ) Notice: Subject to any disclaimer, the term of this patent is extended or adjusted under 35 U.S.C. 154(b) by 176 days.

This patent is subject to a terminal disclaimer.

(21) Appl. No.: 18/603,863

(22) Filed: Mar. 13, 2024

(65) Prior Publication Data

US 2024/0249280 A1 Jul. 25, 2024

Related U.S. Application Data

(63) Continuation of application No. 17/040,482, filed as application No. PCT/IB2019/052185 on Mar. 18, 2019, now Pat. No. 12,014,364.

(30) Foreign Application Priority Data

Mar. 23, 2018 (GB) ...................................... 1804739
Mar. 23, 2018 (GB) ...................................... 1804740
Mar. 23, 2018 (GB) ...................................... 1804742

(51) Int. Cl.
*G06Q 20/38* (2012.01)
*G06F 16/23* (2019.01)
(Continued)

(52) U.S. Cl.
CPC ..... *G06Q 20/3829* (2013.01); *G06F 16/2365* (2019.01); *G06F 16/2379* (2019.01);
(Continued)

(58) Field of Classification Search
None
See application file for complete search history.

(56) References Cited

U.S. PATENT DOCUMENTS 5,581,615 A * 12/1996 Stern ..................... H04L 9/3218 713/180
6,282,295 B1 * 8/2001 Young ................... H04L 9/3013 380/30
(Continued)

FOREIGN PATENT DOCUMENTS

FR 3076152 A1 * 6/2019 ............. G06Q 10/06
FR 3097093 A1 * 12/2020 ........... H04L 9/3066
(Continued)

OTHER PUBLICATIONS

Matteo Campanelli et al_Zero-Knowledge Contingent Payments Revisited (Year: 2017) (Year: 2017) (Year: 2017).*
(Continued)

*Primary Examiner* — Neha Patel
*Assistant Examiner* — Jahed Ali
(74) *Attorney, Agent, or Firm* — Christopher Harris

(57) ABSTRACT

This invention relates to a computer-implemented method for enabling zero-knowledge proof or verification of a statement (S) in which a prover proves to a verifier that a statement is true while keeping a witness (W) to the statement a secret. The method includes sending to the verifier a statement (S) represented by an arithmetic circuit configured to implement a function circuit and determine whether a function circuit output (h) and an elliptic curve point (P), the function circuit input (s) to a wire of the function circuit is equal to the corresponding elliptic curve point multiplier (s); individual wire commitments and a batched commitment for wires of the circuit; a function circuit output (h); proving key (PrK) to enable the verifier to determine that the circuit is
(Continued)

satisfied and calculate the elliptic curve point (P) to validate the statement, determin that the prover holds the witness (w) to the statement.

22 Claims, 6 Drawing Sheets

(51) Int. Cl.

| | |
|---|---|
| ***G06F 16/2458*** | (2019.01) |
| ***G06Q 20/06*** | (2012.01) |
| ***G06Q 20/12*** | (2012.01) |
| ***G06Q 20/40*** | (2012.01) |
| ***G06Q 30/018*** | (2023.01) |
| ***G06Q 30/0207*** | (2023.01) |
| ***G06Q 40/04*** | (2012.01) |
| ***H04L 9/00*** | (2022.01) |
| ***H04L 9/06*** | (2006.01) |
| ***H04L 9/08*** | (2006.01) |
| ***H04L 9/30*** | (2006.01) |
| ***H04L 9/32*** | (2006.01) |
| *G06F 7/72* | (2006.01) |

(52) U.S. Cl.

CPC ..... *G06F 16/2465* (2019.01); *G06Q 20/0655* (2013.01); *G06Q 20/1235* (2013.01); *G06Q 20/38215* (2013.01); *G06Q 20/3825* (2013.01); *G06Q 20/3827* (2013.01); *G06Q 20/389* (2013.01); *G06Q 20/401* (2013.01); *G06Q 30/0185* (2013.01); *G06Q 30/0215* (2013.01); *G06Q 40/04* (2013.01); *H04L 9/008* (2013.01); *H04L 9/0637* (2013.01); *H04L 9/0819* (2013.01); *H04L 9/0869* (2013.01); *H04L 9/3066* (2013.01); *H04L 9/3073* (2013.01); *H04L 9/3221* (2013.01); *G06F 7/725* (2013.01); *G06F 2216/03* (2013.01); *G06Q 2220/00* (2013.01); *H04L 9/50* (2022.05)

(56) References Cited

U.S. PATENT DOCUMENTS

| | | | | |
|---|---|---|---|---|
| 8,751,806 | B1* | 6/2014 | Adler | H04L 9/3066 713/153 |
| 9,602,285 | B2* | 3/2017 | Sakumoto | H04L 9/3271 |
| 11,049,128 | B1* | 6/2021 | Olson | G06Q 20/4014 |
| 11,055,707 | B2* | 7/2021 | Lingappa | G06Q 20/3825 |
| 11,151,558 | B2* | 10/2021 | Ferenczi | G06Q 20/12 |
| 11,310,060 | B1* | 4/2022 | Poelstra | H04L 9/3066 |
| 11,496,309 | B2* | 11/2022 | del Pino | H04L 9/30 |
| 11,645,658 | B2 | 5/2023 | Mohassel et al. | |
| 11,831,748 | B1* | 11/2023 | Fisher | G06Q 20/389 |
| 2007/0121933 | A1* | 5/2007 | Futa | H04L 9/3066 380/1 |
| 2015/0341792 | A1* | 11/2015 | Walsh | H04W 12/08 713/176 |
| 2016/0358165 | A1* | 12/2016 | Maxwell | H04L 9/50 |
| 2017/0278100 | A1* | 9/2017 | Kraemer | G06Q 20/3678 |
| 2017/0279611 | A1* | 9/2017 | Kraemer | G06Q 20/065 |
| 2017/0286717 | A1* | 10/2017 | Khi | H04W 12/10 |
| 2017/0346833 | A1* | 11/2017 | Zhang | G06F 16/951 |
| 2017/0366347 | A1* | 12/2017 | Smith | H04L 9/3247 |
| 2018/0034634 | A1* | 2/2018 | Benarroch Guenun | H04L 9/3073 |
| 2018/0159689 | A1* | 6/2018 | Keuffer | H04L 9/3221 |
| 2018/0270065 | A1* | 9/2018 | Brown | H04L 9/3239 |
| 2019/0026821 | A1* | 1/2019 | Bathen | G06Q 40/00 |
| 2019/0034923 | A1* | 1/2019 | Greco | G06Q 20/383 |
| 2019/0213584 | A1* | 7/2019 | Shanmugam | G06Q 20/065 |
| 2020/0053054 | A1* | 2/2020 | Ma | H04L 9/0894 |
| 2020/0219099 | A1* | 7/2020 | Mohassel | H04L 9/3218 |
| 2020/0342452 | A1* | 10/2020 | Diamond | G06Q 20/3674 |
| 2021/0027294 | A1* | 1/2021 | Trevethan | G06Q 20/389 |
| 2021/0158342 | A1* | 5/2021 | Bartolucci | G06Q 20/3825 |
| 2023/0412358 | A1* | 12/2023 | Bartolucci | H04L 9/3239 |

FOREIGN PATENT DOCUMENTS

| | | | | |
|---|---|---|---|---|
| JP | H08160857 | A | 6/1996 | |
| WO | 2016200885 | A1 | 12/2016 | |
| WO | 2017079652 | A1 | 5/2017 | |
| WO | WO-2017095671 | A1 * | 6/2017 | H04L 9/3242 |
| WO | 2018007828 | A2 | 1/2018 | |
| WO | WO-2023046409 | A1 * | 3/2023 | H04L 9/3255 |

OTHER PUBLICATIONS

Bootle, Jonathan, et al. "Efficient zero-knowledge proof systems." Foundations of security analysis and design VIII. Springer, Cham, 2016. 1-31. (Year: 2016) (Year: 2016) (Year: 2016).*
Wahby, R. S. et al.: "Double-efficient zkSNARKs without trusted setup," Cryptology ePrint Archive, Paper 2017/1132 ver:20180209:012456, [online], Feb. 9, 2018, pp. 1-29.
Danezis, G. et al.: "Pinocchio Coin: Building Zerocoin from a Succinct Pairing-based Proof System," PETShop'13: Proceedings of the First ACM workshop on Language support for privacy-enhancing technologies, Nov. 2013, pp. 27-30.
Antonopoulos, "Mastering Bitcoin—Unlocking Digital Cryptocurrencies," O'Reilly Media, Inc., Dec. 20, 2014, 282 pages.
Banasik et al., "Efficient Zero-Knowledge Contingent Payments in Cryptocurrencies Without Scripts," European Symposium on Research in Computer Security, Sep. 15, 2016, 25 pages.
Bartok et al., "Trouble Understanding Range Proof of Greg Maxwell's Confidential Transaction," https://crypto.stackexchange.com/questions/47392/trouble-understanding-range-proof-of-greg-maxwells-confidential-transaction, May 13, 2017, 1 page.
Bootle et al., "Efficient Zero-Knowledge Arguments for Arithmetic Circuits in the Discrete Log Settings", Annual International Conference on the Theory and Applications of Cryptographic Techniques. Springer, Berlin, Heidelberg, Apr. 28, 2016, 37 pages.
Bootle et al., "Efficient Zero-Knowledge Proof Systems," Foundations of Security Analysis and Design, Aug. 14, 2016, 32 pages.
Bowe, "Pay-to-Sudoku," GitHub, retrieved from https://github.com/zcash-hackworks/pay-to-sudoku/blob/master/README.md, 2016, 2 pages.
Buterin, "Chain Interoperability," Sep. 9, 2016, 25 pages.
Campanelli et al., "Zero-knowledge contingent payments revisited: Attacks and payments for services," Proceedings of the 2017 ACM SIGSAC Conference on Computer and Communications Security, Oct. 30, 2017, 28 pages.
Chase et al., "Efficient Zero-Knowledge Proof of Algebraic and Non-Algebraic Statements with Applications to Privacy and Preserving Credentials," Advances in Cryptology, Jul. 21, 2016, 30 pages.
Chatch, "Stellar XLM to Ethereum ETH Cross-chain Trades," retreived from https://github.com/chatch/xcat/blob/master/docs/protocol_stellar_xlm_to_ethereum_et on Sep. 27, 2018, 4 pages.
Covaci et al., "NECTAR: Non-Interactive Smart Contract Protocol using Blockchain Technology," arXiv preprint arXiv:1803.04860, Mar. 13, 2018, 8 pages.
Fuchsbauer et al., "Proofs on Encrypted Values in Bilinear Groups and an Applicaiton to Anonymity of Signatures," Third International Conference on Pairing-based Cryptography, Aug. 2009, 26 pages.
Fuhr, Lessons from Vanity Zero-Knowledge Work or What to Trust the C[Ir]o[uw]d With, Confidence.org presentation, 2016, 46 pages.
Ganesh, "Zero-Knowledge Proofs: Efficient Techniques for Comnination Statements and Their Applications," Partial PhD Dissertation, New York University, Sep. 2017, 128 pages.
Gibson, "From Zero (Knowledge) to Bulletproofs," 2018, 48 pages.
International Search Report and Written Opinion mailed Jun. 6, 2019, Patent Application No. PCT/IB2019/052185, 14 pages.
International Search Report and Written Opinion mailed Jun. 6, 2019, Patent Application No. PCT/IB2019/052186, 13 pages.

(56) References Cited

OTHER PUBLICATIONS

International Search Report and Written Opinion mailed May 28, 2019 Patent Application No. PCT/IB2019/052184, 14 pages.
Jawurek et al., "Zero-Knowledge Using Garbled Circuits or How to Prove Non-Algebraic Statements Efficiently," Acm Sigsac conference on Computer & communications security, Nov. 2013, 23 pages.
Maxwell, "Confidential Transaction, the Initial Investigation," Retrieved May 9, 2018 from https://elementsproject.org/features/confidential-transactions/investigation, 9 pages.
Maxwell, "The First Successful Zero-Knowledge Contingent Payment," Bitcoin Core, retrieved from https://bitcoincore.org/en/2016/02/26/zero-knowledge-contingent-payments-announcement/, Feb. 26, 2016, 5 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0;prev_next=prev, 2 pages.
UK Commercial Search Report mailed Sep. 6, 2018, Patent Application No. GB1804739.9, 9 pages.
UK IPO Search Report mailed Sep. 24, 2018, Patent Application No. GB1804739.9, 5 pages.
UK IPO Search Report mailed Sep. 24, 2018, Patent Application No. GB1804742.3, 5 pages.
UK IPO Search Report mailed Sep. 7, 2018, Patent Application No. GB1804740.7, 7 pages.
Wikipedia, "Atomic Swap," retrieved from https://en.bitcoin.it/wiki/Atomic_swap, Dec. 2018, 3 pages.
Wikipedia, "Zero Knowledge Contingent Payment," Bitcoin Wiki, retrieved from https://en.bitcoin.it/wiki/Zero_Knowledge_Contingent_Payment, Apr. 8, 2020, 3 pages.
Wikipedia, "Zero-Knowledge Proof," retrieved from https://en.wikipedia.org/w/index.php?title=Zero-knowledge_proof&oldid=826583201 on May 29, 2019, 9 pages.
Zarquan et al., "How Woul I convert Committed Coordinates x and y to a Commitment of the EC POint Without Revealing the Point (in Zero Knowledge) or Vice Versa?" https://crypto.stackexchange.com/questions/52494/how-would-i-convert-committed-coordinates-x-and-y-to-a-commitment-of-the-ec, Oct. 23, 2017, 5 pages.

* cited by examiner (a)

*prior art*

Figure 7:
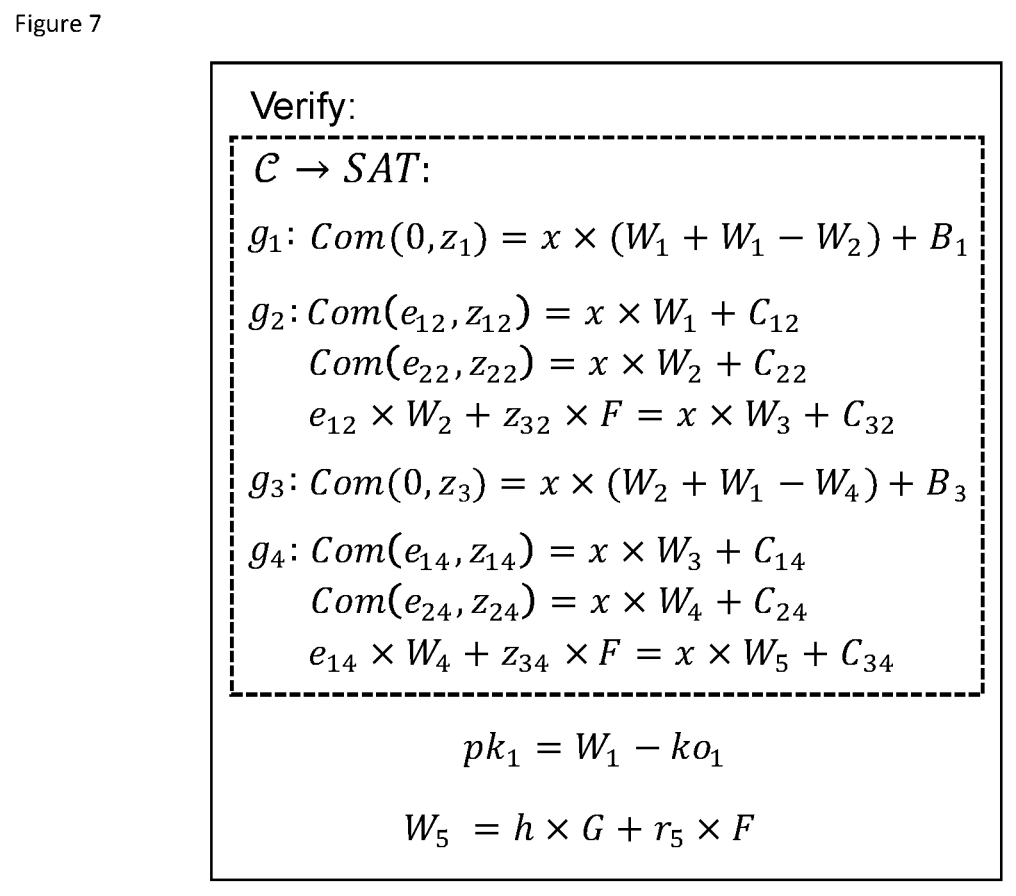

Verify:

$\mathcal{C} \rightarrow SAT$:

$g_1$: $Com(0, z_1) = x \times (W_1 + W_1 - W_2) + B_1$ $g_2$: $Com(e_{12}, z_{12}) = x \times W_1 + C_{12}$ $Com(e_{22}, z_{22}) = x \times W_2 + C_{22}$ $e_{12} \times W_2 + z_{32} \times F = x \times W_3 + C_{32}$ $g_3$: $Com(0, z_3) = x \times (W_2 + W_1 - W_4) + B_3$ $g_4$: $Com(e_{14}, z_{14}) = x \times W_3 + C_{14}$ $Com(e_{24}, z_{24}) = x \times W_4 + C_{24}$ $e_{14} \times W_4 + z_{34} \times F = x \times W_5 + C_{34}$ $pk_1 = W_1 - ko_1$ $W_5 = h \times G + r_5 \times F$

COMPUTER-IMPLEMENTED SYSTEM AND METHOD FOR TRUSTLESS ZERO-KNOWLEDGE CONTINGENT PAYMENT

CROSS-REFERENCE TO RELATED APPLICATIONS

This application is a continuation of U.S. patent application Ser. No. 17/040,482, filed Sep. 22, 2020, entitled "COMPUTER-IMPLEMENTED SYSTEM AND METHOD FOR TRUSTLESS ZERO-KNOWLEDGE CONTINGENT PAYMENT," which is a 371 National Stage of International Patent Application No. PCT/IB2019/052185, filed Mar. 8, 2019, entitled "COMPUTER-IMPLEMENTED SYSTEM AND METHOD FOR TRUSTLESS ZERO-KNOWLEDGE CONTINGENT PAYMENT," which claims priority to United Kingdom Patent Application No. 1804739.9, filed Mar. 23, 2018, United Kingdom Patent Application No. 1804740.7, filed Mar. 23, 2018, and United Kingdom Patent Application No. 1804742.3, filed Mar. 23, 2018, the disclosures of which are incorporated herein by reference in their entirety.

FIELD OF INVENTION

This specification relates generally to computer-implemented methods and systems suitable for implementation in a computer processor, such as a node of a blockchain network, or a group of such processors. Improved methods of generating a proof that enables efficient zero knowledge verification of a statement are provided. The method is suitable for incorporation into existing discrete-log based zero-knowledge proof protocols for circuit satisfiability that do not require the use of bilinear pairing-friendly elliptic curves. The invention is particularly suited, but not limited, to a trustless fair-exchange of data. One of the parties can prove knowledge of a key or statement without revealing said statement in order to effect a secure trust-less exchange between said participants. In particular, the data exchanged enables the determination of a private key for a specified vanity address on a blockchain network.

BACKGROUND OF INVENTION

In this document the term 'blockchain' to include all forms of electronic, computer-based, distributed ledgers. These include consensus-based blockchain and transaction-chain technologies, permissioned and un-permissioned ledgers, shared ledgers, and variations thereof. The most widely known application of blockchain technology is the Bitcoin ledger, although other blockchain implementations have been proposed and developed.

While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource. A blockchain is a peer-to-peer, electronic ledger which is implemented as a computer-based decentralised, distributed system made up of blocks which in turn are made up of transactions.

Each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

Further, in this document reference is made to the structures of known zero-knowledge proof protocols and systems that use arithmetic circuits. Blockchains provided a decentralised and permission-less global mechanism that enables a solution to the problem of fair-exchange between two mutually un-trusting parties without the need for third party arbitration or escrow. The fair exchange of data or information, for financial reward or in exchange for information such as digital goods, is embodied in a transaction protocol known as a Zero-Knowledge Contingent Payments (ZKCP)[Maxwell 2016]. In a ZKCP, specified data is transferred from seller to buyer only if a payment is confirmed, and the payment from buyer to seller is only completed if the specified data is valid according to the conditions of the sale. Details of such a protocol are known[Campanelli 2017] but it is essentially based on the combination of a hash-time-locked contract (HTLC) with a zero-knowledge proof which simultaneously verifies that some encrypted information (the 'digital good') is valid/correct and that the 'password' to decrypt this information is the data that must be revealed on the blockchain to claim the payment.

The central component of a ZKCP protocol is a zero-knowledge proof for a series of dependent statements about data/information validity or correctness, key validity, and its corresponding hash value. Such complex composite statements require an efficient zero-knowledge proof system for general computations: in essence this enables one party to run an arbitrary program with secret inputs and then prove to another party that the program accepted the inputs as valid and was executed correctly–without revealing anything about the secret inputs or the execution of the program. In known ZKCP examples, the general purpose zero-knowledge proof system employed has been based on the succinct non-interactive arguments of knowledge (SNARKs) framework as implemented in the Pinocchio protocol[Parno 2016] and the C++ libsnark library[Libsnark 2016]. Zero knowledge SNARKs (zkSNARKs) provide a method of proving, in zero-knowledge, the validity of arbitrary computations that can be expressed as arithmetic circuits. The two main distinguishing properties of zkSNARKs are that they are non-interactive (the prover sends the proof to the verifier in one move) and succinct (the proof is small and easy to verify). However, they have significant limitations:

- The proof generation is extremely computationally demanding.
- The proving key is very large and proportional to the circuit size.
- They depend on strong and un-tested cryptographic assumptions (i.e. the knowledge of exponent assumption and pairing-based assumptions).
- For any given program (circuit) they require a common reference string (CRS) to be computed by a third party who must be trusted to delete the set-up parameters. Any party with knowledge of the set-up parameters has the ability to create fake proofs.

The construction of zkSNARKs to prove statements that involve arbitrary cryptographic elliptic curve key operations has not been attempted to date, but would hypothetically consist of arithmetic circuits with many hundreds-of-thousands or millions of gates and, as a consequence, proof generation times would take several minutes and proving keys would be hundreds of megabytes in size.

TECHNICAL BACKGROUND

A basic system for an interactive zero-knowledge proof can use a Σ (Sigma) protocol, which involves a number of communication steps between the prover and verifier. Usually Σ protocols involve 3 moves: the prover sends an initial commitment (a) to the verifier, the verifier then responds with a random challenge (x) and finally the prover answers with a final response, or 'opening' (z). The verifier then accepts or rejects the statement based on the transcript (a,x,z).

Σ protocols can be used to prove knowledge of, or statements about, a witness (w) that is known only to the prover. The protocol is zero-knowledge if it does not reveal any information about the witness, or secret, to the verifier, except for the fact that a statement related to the witness is true[*Bootle* 2016].

Central to many interactive zero-knowledge protocols are commitment schemes, which are used to for arithmetic circuit satisfiability. A commitment enables a prover to commit to a secret value in advance, and then later verifiably reveal (open) the secret value. A commitment scheme has two main properties. Firstly, it is hiding—the commitment keeps the value secret. Secondly, it is binding–the commitment can only be opened to the originally committed value. A Pedersen commitment[*Bootle* 2016] scheme involves two elliptic curve generator points: G and F in the group $\mathbb{G}$ of prime order p, known to all parties. The committer generates a secure random number r in the field of prime integers $\mathbb{Z}_p$, and then computes the commitment (via elliptic curve addition/multiplication) to the secret value s:

$$Com(s, r) = s \times G + r \times F,$$

wherein × denotes elliptic curve point multiplication.

The committer can at a later stage fully open the commitment (i.e. it can be verified), by providing the values s and r. The committer can also open the commitment in response to a specific challenge value as part of a Σ protocol, without revealing the secret s or random number r).

Pedersen commitments are additively homomorphic, meaning that adding (on the elliptic curve) two commitments results in a commitment to the sum of the committed values, i.e.:

$$(s_1 \times G + r_1 \times F) + (s_2 \times G + r_2 \times F) = (s_1 + s_2) \times G + (r_1 + r_2) \times F$$

Proofs of arithmetic circuit satisfiability can be achieved in 'zero knowledge'. An arithmetic circuit (over a field $\mathbb{Z}_p$) is a virtual construction of arithmetic gates that are connected by wires (forming a directed acyclic graph), that is capable of performing an arbitrarily complex computation, wherein the computation is limited to integer operations and must have no data dependant loops or mutable state.

Each gate has two input wires and one output wire and performs either a multiplication (×) or addition (+) operation on the inputs. FIG. 1*a* shows a schematic of a multiplication gate with left ($w_L$) and right ($w_R$) wire inputs and one wire output ($w_O$), while FIG. 1*b* shows a schematic of a simple arithmetic circuit with three gates, three input wires ($w_1$, $w_2$, $w_3$), one output wire ($w_6$) and two internal wires ($w_5$, $w_6$).

In practice, a complete circuit has free input wires and free output wires that define the external (circuit) input and output values. A legal assignment is a definition of the values of the wires as those which satisfy the circuit, i.e. each wire is assigned a value where the output of each gate correctly corresponds to the product or sum of the inputs (i.e. the gate is consistent).

For a given arithmetic circuit, a prover can prove to a verifier that they know a legal assignment for the circuit without revealing the wire values, by first committing to each wire value in the legal assignment (with Pedersen commitments) and then performing special Σ protocols with the verifier for each gate in the circuit (which can be performed in parallel), with the wire values as the witness. These Σ protocols exploit the homomorphic properties of Pedersen commitments, as described below.

To produce the proof (that a circuit is satisfied), initially the prover generates a commitment to each wire $w_i$ in the circuit (i=1, . . . , n where n is the number of wires) and sends these to the verifier:

$$W_i = Com(w_i, r_i)$$

For each 'addition' gate in the circuit (one is shown in FIG. 1*b*), the $\Sigma_{zero}$ protocol is executed: this involves proving (in zero knowledge) that $w_L+w_R-w_O=0$ (i.e. that the addition gate is satisfied: the input wires $w_L$ and $w_R$ equal the output wire $w_O$). This involves the following steps:

1. The prover generates a commitment to zero: $B=Com(0, r_B)$, and sends to the verifier.
2. The verifier responds with a random challenge value: $x \leftarrow \mathbb{Z}_p$.
3. The prover then computes the opening value: $z=x(r_L+r_R-r_O)+TB$ and sends it to the verifier.
4. The verifier checks that $Com(0, z)=x \times (W_L+W_R-W_O)+B$ as proof that $w_L+w_R-w_O=0$.

B denotes a curve point, similar to a public key; $B=r \times F+0 \times G$.

$r_B$ denotes the corresponding paired private key.

For each 'multiplication' gate (as shown in FIG. 1*a*) the $\Sigma_{prod}$ protocol is executed: this involves proving (in zero-knowledge) for each multiplication gate that $w_L \cdot w_R=w_O$ (i.e. that the multiplication gate is satisfied).

1. The prover generates 5 random blinding values: $t_1$, $t_2$, $t_3$, $t_4$, $t_5 \leftarrow \mathbb{Z}_p$.
2. The prover computes $C_1=Com(t_1, t_3)$, $C_2=Com(t_2, t_5)$ and $C_3=t_1 \times W_R+t_4 \times F$ and then sends them to the verifier.
3. The verifier responds with a random challenge value: $x \leftarrow \mathbb{Z}_p$.
4. The prover computes the opening values:

$$e_1 = w_L x + t_1$$

$$e_2 = w_R x + t_2$$

$$z_1 = r_L x + t_3$$

$$z_2 = r_R x + t_5$$

$$z_3 = (r_O - w_L r_R)x + t_4.$$

and sends them to the verifier.

5. The verifier then checks the following equalities:

$$Com(e_1, z_1) = x \times W_L + C_1$$

$$Com(e_2, z_2) = x \times W_R + C_2$$

$$e_1 \times W_R + z_3 \times F = x \times W_O + C_3$$

as proof that $w_L \cdot w_R = w_O$.

The $\Sigma_{zero}$ and $\Sigma_{prod}$ protocols can be operated in parallel for the verification of each gate in the circuit, and the same verifier challenge value (x) can be used for all gates.

As an example, consider the circuit in FIG. 1*b*: for a prover to prove in zero-knowledge to a verifier that they know a legal assignment (i.e. the wire values satisfying the circuit), the prover initially sends the wire commitments ($W_1, \ldots, W_6$) and the $\Sigma$ protocol commitments for each gate to the verifier (this is one additional commitment for each addition gate and five for each multiplication gate).

The verifier then responds with the random challenge $x \leftarrow \mathbb{Z}_p$, and the prover computes the opening values for each gate (one for each addition and five for each multiplication) and sends them back to the verifier. The verifier then performs the $\Sigma$ protocol checks to verify that:

$$w_1 \cdot w_2 = w_4$$

$$w_4 \cdot w_5 = w_6$$

$$w_2 + w_3 = w_5$$

and therefore, that the commitments $W_1, \ldots, W_6$ correspond to satisfying wire values $w_1, \ldots, w_6$.

If the prover wants to show that, in addition to satisfying the circuit, a particular wire has a particular value, they can fully open the commitments to the relevant wires. In the example, the prover can additionally send the verifier the values $w_6$ and $r_6$ (the verifier can then confirm that $W_6 = Com(w_6, r_6)$) to demonstrate that $w_6$ is the actual output from a particular legal assignment.

The example in FIG. 1*b* is a trivial circuit. In practice, useful circuits consist of many more gates. Of particular interest is an arithmetic circuit for the SHA-256 hash function–this circuit enables a prover to demonstrate that they know the pre-image (input) to a SHA-256 function that hashes to a particular (output) value, without revealing the pre-image. One of the most efficient implementations of a circuit for the SHA-256 algorithm consists of 27,904 arithmetic gates[Zcash 2016]. To prove knowledge of a SHA-256 pre-image would then require the sending of approximately 5 MB of data in both the initial commitment and opening rounds of the above protocol, and require approximately 200,000 elliptic curve operations for both the prover and verifier (taking a few seconds of processor time each).

There are several methods that have been developed to significantly improve the performance of the parallel $\Sigma$ protocol approach to proving arithmetic circuit satisfiability. Known approaches[Bootle 2016][Groth 2009] involve batching the commitments to circuit wire values to substantially reduce the size of data that must be sent from the prover to the verifier (i.e. reducing the communication complexity). These methods enable proof systems where the communication complexity is reduced from $\mathcal{O}(n)$ to $\mathcal{O}(\sqrt{n})$ or $\mathcal{O}(\log(n))$.

Again, as a comparison for proving the satisfiability of the same SHA circuit, the protocol[Bootle 2016] has a proving key size of just 5 KB and a key generation time of 180 ms. The Proof size is 24 KB and takes approximately 4 seconds to generate, and the proof also takes approximately 4 seconds to verify.

These methods are not described in full here, except to state that the main vector batching protocol employed is described in the steps below. This follows the same properties as the standard Pedersen commitment, but committing to n elements ($m = m_1, \ldots, m_n$) only requires the sending of a single group element:

1. The prover and verifier agree on a group element $F \leftarrow \mathbb{G}$.
2. The prover generates n random numbers $x_1, \ldots, x_n \leftarrow \mathbb{Z}_p$.
3. The prover computes the points $K_i = x_i \times F$ (for $i = 1, \ldots, n$). These values form a proving key PrK that is sent to the verifier.
4. The prover generates a random value: $r \leftarrow \mathbb{Z}_p$.
5. The prover computes the commitment:

$$Com(m) = r \times F + \sum_{i=1}^{n} m_i \times K_i$$

and sends it to the verifier.

SUMMARY OF INVENTION

Overall, the invention resides in a computer-implemented method for enabling zero-knowledge proof or verification of a statement. A prover can prove to a verifier that a statement is true while keeping a witness to the statement a secret, using the method herein.

In particular, the witness can be access data that, when obtained, enables the verifier to access data secured by the witness. The data secured can be secured using a blockchain network and its functionality. More particularly, the witness can be access data that enables the determination of a private key for a specified vanity address on a blockchain network.

The statements are composite statements that involve both arithmetic circuit satisfiability and dependent statements about the validity of public keys (key-statement proofs) simultaneously.

The method herein can be used in known protocols for circuit satisfiability, such as existing discrete-log based zero-knowledge proof protocols. The method is particularly suited to protocols that do not require the use of bilinear pairing-friendly elliptic curves.

In the method, a prover sends to a verifier a set of data including a statement, which for a given function circuit output and an elliptic curve point, the function circuit input is equal to the corresponding elliptic curve point multiplier. The statement can be that the prover knows a private key for a specified vanity address on a blockchain network.

The data includes individual wire commitments and/or a batched commitment for the circuit of the statement, an input and an output. The prover can include in the data, or have shared in advance, the specification of each elliptic curve used in the statement. The prover then sends an opening, in response to a challenge from the verifier. Alternatively, the prover additionally includes a proving key.

With the data received from the prover, the verifier is able to determine that the circuit is satisfied and validate the statement, thus determining that the prover holds the witness to the statement. The elliptic curve point can also be calculated. Upon receiving the data, the verifier determines through calculations that the data complies with the statement. The invention is particularly suited to the zero-knowledge proof of equivalence of a hash pre-image and an elliptic curve private key.

Thus, in accordance with the present invention there is provided a method and system as defined in the appended claims.

Thus, it is desirable to provide a computer-implemented method for computer-implemented method for enabling a trustless zero-knowledge contingent payment or exchange of reward data from a buyer or verifier in exchange for access data from a seller or prover. The reward data can be data associated with a payment, such as the allocation of an unspent transactional output (UTXO). The access data can be, or provide access to a secret key from EC key pair. Overall, the method enables a verifier to prove that they possess the data requested.

There may be provided a computer-implemented method for enabling a trustless zero-knowledge contingent payment or exchange of reward data from a buyer or verifier in exchange for access data from a seller or prover, the method including:

- receiving from a buyer a buyer public key ($pk_B$) derived from multiplying a buyer secret key ($sk_B$) with an elliptic curve generator point (G);
- generating a seller public key ($pk_s$) determined from multiplying a seller secret key (i) with an elliptic curve generator point (G), wherein the seller secret key is the access data or is used to secure the access data required by the buyer;
- preparing and sending a data set to the buyer, said data set including a zero-knowledge proof statement, which for a given function circuit output of an arithmetic circuit representing the statement, and an elliptic curve point, the function circuit input is equal to the seller secret key (i), wherein said statement enables the buyer to determine that the circuit is satisfied and validate the statement, thus determining that the seller holds the required seller secret key that unlocks the access data;
- receiving from the buyer a first transaction $Tx_1$ which contains an output that allocates the reward data to the buyer, which is accessible using the seller secret key (i); and
- signing and broadcasting the first transaction on a blockchain, such that it is mined into a block, and accessing the reward data from the output of the first transaction $Tx_1$ by providing a second transaction $Tx_2$ supplying the seller secret key (i) to unlock the reward data, which is then revealed on the blockchain, thus enabling the buyer to obtain the access data offered by the seller.

The method includes receiving from a buyer a buyer public key derived from multiplying a buyer secret key with an elliptic curve generator. This buyer public key can be the 'seed' used to secure the access data or maintain the confidentiality of the access data or secret key. The method also includes generating a seller public key determined from multiplying a seller secret key with an elliptic curve generator, wherein the seller secret key is the access data or is used to secure the access data required by the buyer. Further, the method includes: preparing and sending a data set to the buyer, said data set including a zero-knowledge proof statement, which for a given function circuit output and an elliptic curve point, the function circuit input is equal to the seller secret key, wherein said statement enables the buyer to determine that the circuit is satisfied and validate the statement, thus determining that the seller holds the required seller secret key that unlocks the access data; receiving from the buyer a first transaction $Tx_1$ which contains an output that allocates the reward data to the buyer, which is accessible using the seller secret key. The secret key can be the circuit function input. Finally, the method includes signing and broadcasting the first transaction on a blockchain, such that it is mined into a block, and accessing the reward data from the output of the first transaction $Tx_1$ by providing a second transaction $Tx_2$ supplying the seller secret key to unlock the reward data, which is then revealed on the blockchain, thus enabling the buyer to obtain the access data offered by the seller. The verifier can also provide their signature in addition to the seller secret key.

The method can be used by the prover or seller to enable a zero-knowledge contingent transaction for access data, such as an encryption key. The prover can liaise with a verifier or buyer to confirm the reward data to be provided and the access data to be received and establishes a communication channel with the verifier. The communication channel can be open.

The prover or seller can receive an elliptic curve public key $pk_B$ from the verifier or buyer, said seller having generated said public key from a secure random secret key $sk_B$, wherein:

$$pk_B = sk_B xG,$$

and G is an elliptic curve, and the prover or seller can secure the access data to be provided with a locking value i, such that:

$$\text{access data} = pk_B + i \times G$$

and the seller can include in the data set sent to the buyer their public key, wherein $pk_S = i \times G$, and an output f(i) from the function circuit wherein the function circuit input is the locking value i.

The prover or seller can send the statement (S) proof to the verifier or buyer that proves to the verifier that the input to the function circuit is the private key corresponding to $pk_S$. This can enable the verifier to verify the proof, and confirm that the address corresponding to $pk = pk_V + pk_P$ matches the agreed pattern, thus determines that knowing the locking value i enables derivation of the full private key for the access data ($sk_B + i$), and that the locking value i is the function circuit input to the function circuit i.

The seller can receive from the buyer the transaction $Tx_1$ which contains an output that contains the reward data to be received, which can be accessed by a signature from the seller and the function circuit input, i, and the seller can sign and broadcasts the transaction on a blockchain, where it is mined into a block, enabling the seller to obtain the access data from the output of the transaction $Tx_1$ by providing the second transaction $Tx_2$ supplying their signature and the value i to unlock the transaction, which is then revealed on the blockchain, thus enabling the buyer to identify the locking value i and obtain the access data offered by the seller, wherein $$sk = sk_B + i,$$

-continued where $$pk = sk \times G.$$

It is equally desirable to provide a complementary computer-implemented method from the buyer or verifier's perspective, such that the method of the invention extends to the reciprocal actions taken by the verifier in a plug-socket manner. The invention extends to the full collaboration between the prover and the verifier.

Thus the invention also resides in a computer-implemented method for enabling a trustless zero-knowledge contingent payment or exchange of reward data from a buyer or verifier in exchange for access data from a seller or prover, the method including: sending a seller a buyer public key derived from multiplying a buyer secret key with an elliptic curve generator; receiving from the seller a data set, said data set including a zero-knowledge proof statement, which for a given function circuit output and an elliptic curve point, the function circuit input is equal to a seller secret key, wherein a seller's public key is derived from multiplying the seller secret key with an elliptic curve generator, wherein the seller secret key is the access data or is used to secure the access data; verifying the proof; sending the buyer a first transaction $Tx_1$ which contains an output that allocates the reward data to the buyer in exchange for obtaining the access data, which is accessible using the seller secret key; confirming, on a blockchain, that the seller has signed and broadcast the first transaction such that it is mined into a block, thus enabling the seller to accesses the reward data from the output of the first transaction $Tx_1$ by providing a second transaction $Tx_2$ supplying their signature and the seller secret key to unlock the reward data; and obtaining the access data offered by the seller. The method can be used by the buyer or verifier to make a zero-knowledge contingent transaction or payment for data, such as an encryption key.

The method can further include sending an elliptic curve public key $pk_B$ to the seller, said seller having generated said public key from a secure random secret key $sk_B$, wherein:

$$pk_S = sk_S \times G,$$

and G is an elliptic curve, and the seller secures the access data to be provided with a locking value i, such that:

$$\text{access data} = pk_S + i \times G$$

and receiving from the seller, with the data set, their public key, wherein $pk_S = i \times G$, and an output f(i) from the function circuit wherein the function circuit input is the locking value i.

The prover or seller can send the statement (S) proof to the verifier or buyer that proves to the verifier that the input to the function circuit is the private key corresponding to $pk_S$. This can enable the verifier to verify the proof, and confirm that the address corresponding to $pk = pk_V + pk_P$ matches the agreed pattern, thus determines that knowing the locking value i enables derivation of the full private key for the access data ($sk_B + i$), and that the locking value i is the function circuit input to the function circuit i.

The method can further include sending the buyer a transaction $Tx_1$ which contains an output that contains the access data to be received, which can be accessed by a signature from the seller and the function circuit input, i, wherein the seller signs and broadcasts the transaction on a blockchain, where it is mined into a block, enabling the seller to access the data from the output of the transaction $Tx_1$ by providing a second transaction $Tx_2$ supplying their signature and the value i to unlock the transaction, which is then revealed on the blockchain, accessing the blockchain to identify the locking value i and access the digital content offered by the seller, wherein $$sk = sk_B + i,$$

where $pk = sk \times G$.

The reward data to be received from the seller includes a cryptocurrency payment. The data can be an unspent transaction output, or UTXO. The data can include a Bitcoin payment. The blockchain referred to throughout this application can be the Bitcoin blockchain.

The access data to be provided by the seller is a secret key of a vanity address or enables the determination of a secret key of a vanity address. The seller secret key can be the locking value i, which is used to secure the digital content and is required by the buyer. The desired vanity address is specified in advance.

Thus, it is also desirable to provide a computer-implemented method for a computer-implemented method for enabling zero-knowledge proof or verification of a statement in which a prover proves to a verifier that a statement is true while keeping a witness (w) to the statement a secret. The proof can be explicit proof.

The method includes the prover sending to the verifier a set of data. The set of data includes a statement having an arithmetic circuit with m gates and n wires configured to implement a function circuit and determine whether for a given function circuit output (h) and an elliptic curve point (P), the function circuit input (s) to the function circuit, or a wire in the function circuit, is equal to the corresponding elliptic curve point multiplier (s). The function circuit can be a circuit that implements the function of a hash function. The pre-image to the hash function circuit or a wire in the function circuit can be equal to the corresponding elliptic curve point multiplier.

The data also includes individual wire commitments and/or a batched commitment. The commitment, or each commitment, can be a wire inputs and outputs, which are encrypted, for gates of the circuit. The data also includes an input. The input operates as a key opening for a wire of the arithmetic circuit [elliptic curve point (P)]. Either the prover or verifier can name the wire. The input or key opening can be for the first wire in the circuit. The data also includes a function circuit output. The specification of each elliptic curve used in the statement can be included in the data.

After sending the data the prover receives from the verifier a challenge value and responds with an opening. The opening can be a value statement as per the Σ (sigma) protocol. The opening values can be for each gate of the circuit that enable the verifier to determine that the statement is true and calculate the elliptic curve point.

As an alternative to awaiting a challenge, the prover can additionally send a proving key to the verifier. The proving key can be generated from the data that is part of the proof. The proving key can be a hash of one or more of the random numbers used in the proof.

The data sent to the verifier enables the verifier to determine that the circuit is satisfied and calculate the elliptic curve point and validate the statement, thus determining that the prover holds the witness to the statement.

The set of data sent and/or the opening to the challenge that is sent to the verifier can function like a key that is created independently of the verifier. The challenge from the verifier is analogous to determining the identity of the prover and the integrity of the key.

The input or key opening can be for the first wire in the arithmetic circuit. It is preferable, however, that a random wire is selected because proving knowledge of an intermediate wire is more difficult than proving knowledge of the first. Moreover, selecting a random wire other than the first is more robust and inhibits discovery of the proof or witness by a malicious third party.

It is equally desirable to provide a complementary computer-implemented method for a computer-implemented method for enabling zero-knowledge proof or verification of a statement in which a verifier verifies that a statement is true, without knowing the witness (w) to the statement, by analysing data received from a prover. To be clear, the method of the invention extends to the reciprocal actions taken by the verifier in a plug-socket manner. The invention extends to the full collaboration between the prover and the verifier.

The prover can send an individual wire commitment and communicate with the verifier using Σ (Sigma) protocols to prove knowledge of the witness. Upon receipt of an individual wire commitment from the prover, a verifier can communicate with the prover using Σ protocols to confirm that the prover has knowledge of the witness.

The prover can, in addition or alternatively to awaiting a challenge value, send to the verifier a random value for enabling the verifier to determine that the statement is true and calculate the elliptic curve point. Upon receipt of data from the prover, the verifier can alternatively receive a random value for enabling the verifier to determine that the statement is true and calculate the elliptic curve point. The random value can be a function of at least one commitment. Said function can be a hash function.

The random value, or challenge, can be replaced to improve the convenience and efficiency of the process. There are also risks associated with the verifier generating a non-random challenge in an attempt to extract information about the witness. Moreover, replacing the challenge value with a random value provided by the prover converts the method from an interactive one to a non-interactive one. The prover can generate a proof that can be independently and publically verified, off-line. The random value can be an output from a hash function. Substituting the random value (x) with the output from a hash of one or more commitments utilises the Fiat-Shamir principles.

The random value can be computed by hashing the concatenation of all the commitments generated and sent to the verifier by the prover.

The commitment can be:

$$W_i = Com(w_i, r_i)$$

wherein

Com is the commitment to the function circuit, $w_i$ is the wire value, $r_i$ is a random number, i.e. it is different for each wire commitment, and i is the wire denomination, such that $$Com(w, r) = w \times G + r \times F$$

wherein

F and G are elliptic curve points.

The input for a wire l in the arithmetic circuit can be:

$$ko = r_1 \times F,$$

wherein ko is a key-opening input, $r_l$ is a random number, and

F is a point on an elliptic curve.

The wire can be the first wire in the circuit.

The verifier can confirm that the circuit is satisfied, and is able to calculate the public key for the wire l via elliptic curve point subtraction:

$$pk_l = Com(w_l, r_l) - ko_l$$

The prover can send a batch of wire commitments and generate random numbers to compute elliptic curve points for each wire to form the proving key.

The batched commitment for the witness can be $$Com(w) = r \times F + \sum_{i=1}^{n-1} w_i \times K_i + w_n \times G$$

wherein r is a random number generated by the prover, the prover computes the commitment to the vector w of wire values $w_i$ (for i=1, . . . , n) where $w_n$ is to be key-opened, $K_i$ are computed elliptic curve points, $w_i$ are wire values, where $w_n$ is the be key opened, F is a point on an elliptic curve.

The input for the wire n in the arithmetic circuit is:

$$ko_n = r \times F + \sum_{i=1}^{n-1} w_i \times K_i$$

wherein $ko_n$ is a key-opening input, r is a random number, and

F is a point on an elliptic curve.

The input can be for the first wire.

The verifier can calculate the public key opening of the key-statement wire, via elliptic curve arithmetic:

$$pk_n = Com(w) - ko_n$$

The prover can additionally send a fully opened commitment to at least one wire. The method can use Pedersen commitments. The statement can use only one arithmetic circuit for the function circuit. The function circuit can implement a hash function. The hash function can be an SHA-256 hash function.

The method can be used by the prover to enable a zero-knowledge contingent transaction (which can be a zero-knowledge contingent transaction) for data, such as an encryption key, wherein the prover liaises with a verifier to confirm the data (which can be a vanity address) to be provided and the data to be received (said data can be a payment in the form of a UTXO) and establishes a communication channel (said channel can be open) with the verifier, the prover receives an elliptic curve public key $pk_B$ from the verifier, said verifier having generated by the verifier from a secure random secret key $sk_B$, wherein $pk_V=sk_V \times G$ and G is an elliptic curve, the prover secures the data to be provided with a locking value i, such that:

$$\text{data} = pk_V + i \times G$$

The prover can have performed a search for the required pattern in the Base58 encoded address derived from by changing i. The prover sends to the verifier their public key, wherein $pk_P=i \times G$, and an output f(i) from the function circuit wherein the function circuit input (e.g. pre-image) is the locking value i.

The prover can send the statement proof to the verifier that proves to the verifier that the input to the function circuit is the private key corresponding to $pk_P$, thus enabling the verifier to verify the proof, and confirm that the address corresponding to $pk=pk_V+pk_P$ matches the agreed pattern, thus determine that knowing the locking value i enables derivation of the full private key for the data, and that the locking value i is the function circuit input to the function circuit.

The prover can receive from the verifier a transaction $Tx_1$ which contains an output that contains the data to be received, which can be accessed by a signature from the prover and the function circuit input, i. The transaction can be a hashed time lock function. The data to be received can provide access to UTXO.

The prover can sign and broadcast the transaction on a blockchain, where it is mined into a block, enabling the prover to access the data from the output of the transaction $Tx_1$ by providing a second transaction $Tx_2$ supplying their signature and the value i to unlock the transaction, which is then revealed on the blockchain, thus enabling the verifier to identify the locking value I and access the data offered by the prover, wherein $$sk = sk_B + i,$$

where $pk=sk \times G$.

The data to be provided by the prover can include a vanity address. The data to be received from the verifier can include a cryptocurrency payment (e.g. UTXO).

The transaction can be fully atomic and trustless: the buyer only gets paid if they provide a valid value i which is revealed publically on the blockchain. Due to the splitting of the private key, the value exposed on the blockchain is of no use to anyone else and does not compromise the security of the full private key.

A computer-implemented method can involve a prover performing a trustless fair-exchange of data (without a third-party centralised exchange) with a verifier. This can be described as a cross-chain atomic swap or atomic trade because in this context refers to the fair exchange property: either both parties complete their transactions or neither do. This swap can be performed between blockchains that support scripting functionality that enable hashed and time-locked contracts.

The prover has access to first data, such as the UTXO for 1 Bitcoin, on a first blockchain, and the verifier has access to second data, such as 100 LTC, residing on a second blockchain, and the prover and verifier agree to exchange said data. The method includes: the prover generating a key-pair for the second blockchain, sending the public key to the verifier, and retaining the private key; the prover receiving a verifier's public key for the first blockchain, said verifier having generated a key-pair for the first blockchain and retaining the private key; the prover sending the statement, one or more commitments, the input or key opening and function circuit output and the elliptic curve specifications.

The prover can create a first blockchain transaction $Tx_A$ that sends the first data to a common public key address, and broadcasts said transaction on the first blockchain network, said address defined by a sum of the input and the verifier's public key. The data can be accessed by the prover after 24 hours if the swap does not take place within that time.

The prover can verify a second blockchain transaction $Tx_B$, said transaction created and broadcast on the second blockchain network by the verifier after confirming the inclusion of the first blockchain transaction $Tx_A$ in the first blockchain, said transaction sending the second data, in the form of 100 LTC, to the prover's public key address that is accessible by the prover using a valid signature for the prover's public key address, and a value that is the function circuit input that determines the function circuit output. This data can be accessed by the verifier after 24 hours if the swap does not take place within that time.

The prover confirms the second blockchain transaction $Tx_B$ is included on the second blockchain and accessing the second data by providing their signature and the value that is the function circuit input of the function circuit output, thus enabling the verifier to observe the value that is the function circuit input that determines the function circuit output and access the first data by providing a signature using the private key (for $P_C$, which is $s_B+s$ from the homomorphic properties of elliptic curve point multiplication).

The data exchanged can be cryptocurrencies and the first data corresponds to an amount of a first cryptocurrency, preferably Bitcoin, and the second data corresponds to an amount of a second cryptocurrency, preferably Litecoin.

As stated above, every action by a prover requires a reciprocal action by a verifier to verify the proof. The invention extends to the methods or actions performed by the verifier. Thus, a computer-implemented method is provided for enabling zero-knowledge proof or verification of a statement in which a prover proves, preferably explicitly, to a verifier that a statement is true while keeping a witness to the statement a secret, the method including: the verifier receiving from the prover: a statement having an arithmetic circuit with m gates and n wires configured to implement a function circuit, preferably a hash function, and determine whether for a given function circuit, and preferably a specified function circuit, output and an elliptic curve point, the function circuit input or pre-image to the function is equal to the elliptic curve point multiplier. The verifier also receives: individual wire commitments and/or a batched commitment, which are encrypted wire inputs and outputs, for wires of the circuit; an input or key opening for a wire, preferably a wire other than the first wire, in the arithmetic circuit; and a function circuit output (h). The verifier can also receive the specification of each elliptic curve used in the statement. The verifier can send a challenge value to the prover, and subsequently receiving an opening. The opening can be as per the Σ protocol and contain values for each gate of the circuit that enable the verifier to determine that the statement is true and calculate the elliptic curve point. Additionally or alternatively, the verifier can receive a proving key from the prover.

The verifier then determines that the circuit is satisfied and calculate the elliptic curve point (P) and validate the statement, thus determining that the prover holds the witness (w) to the statement.

This can be achieved by proving that the prover knows the values for each gate of the statement circuit, in zero knowledge, using the Sigma protocols is the proof is interactive or using the proving key if the Fiat-Shamir heuristic is used. The verifier can receive from the prover the Σ_zero and Σ_prod commitments for each gate, reply with a challenge value, receive from the prover opening values and check against the commitments. The verifier can confirm that the circuit is satisfied by calculating the public key for the wire 1 via elliptic curve point subtraction. The verifier can confirm that each public key for each wire matches the key(s) specified in the statement. The verifier can determine that the fully opened wires match values, which can be specified, in the statement to complete the validation.

It is also desirable to provide a computer readable storage medium comprising computer-executable instructions which, when executed, configure a processor to perform the method performed by the prover, verifier or the prover and verifier collaborating.

It is also desirable to provide an electronic device comprising: an interface device; one or more processor(s) coupled to the interface device; a memory coupled to the one or more processor(s), the memory having stored thereon computer executable instructions which, when executed, configure the one or more processor(s) to perform the methods claimed herein. It is also desirable to provide a node of a blockchain network, the node configured to perform the method as claimed. It is also desirable to provide a blockchain network having such as a node.

BRIEF DESCRIPTION OF THE DRAWINGS

A basic system for an interactive zero-knowledge proof has been described above in the technical background section, using FIG. 1*a* is a schematic of a multiplication gate with left and right wire inputs and one wire output, while FIG. 1*b* is a schematic of an arithmetic circuit with three gates, three input wires, one output wire and two internal wires.

Figure 1:
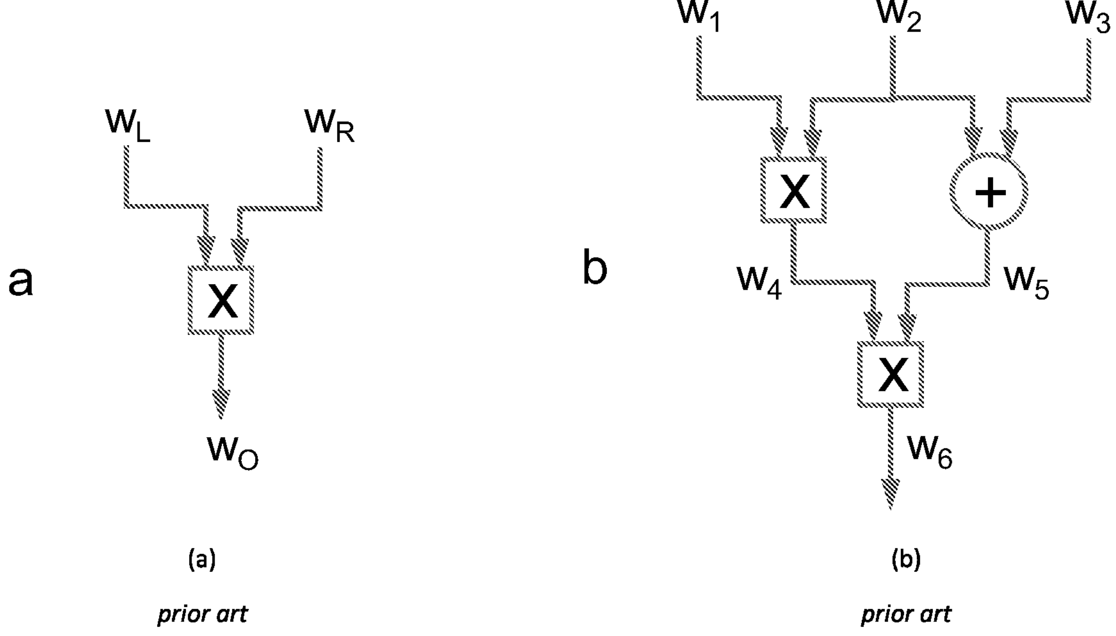
Figure 4:
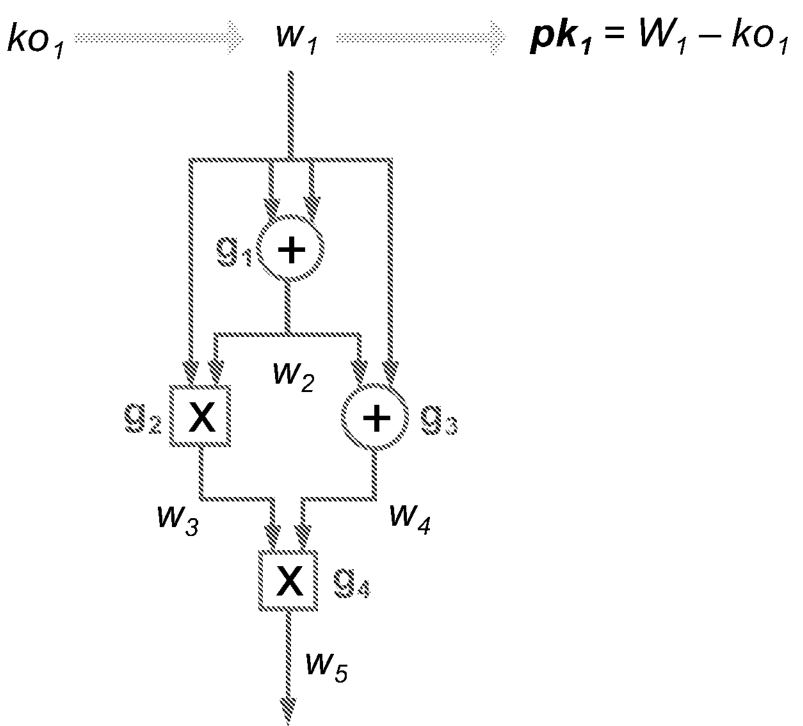
Figure 2:
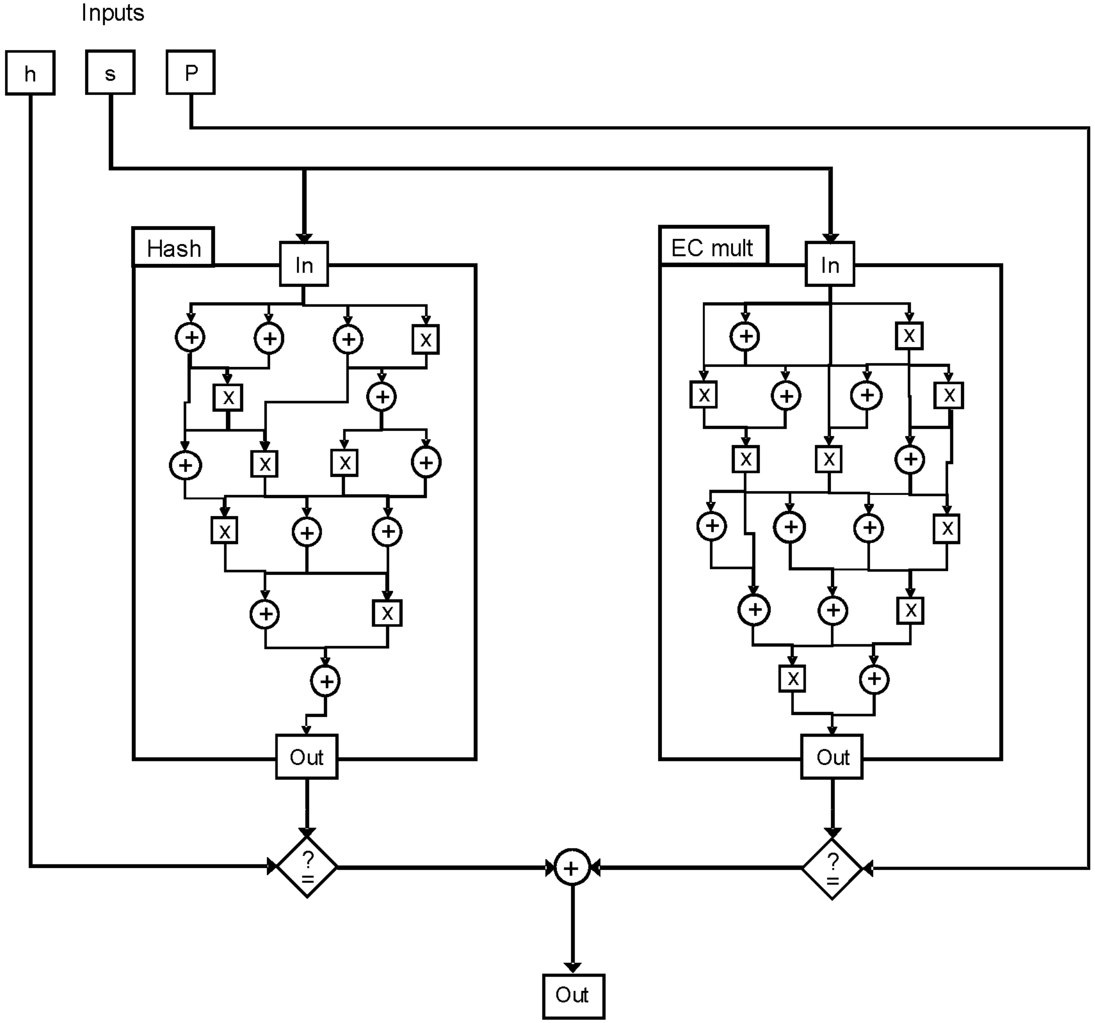
Figure 3:
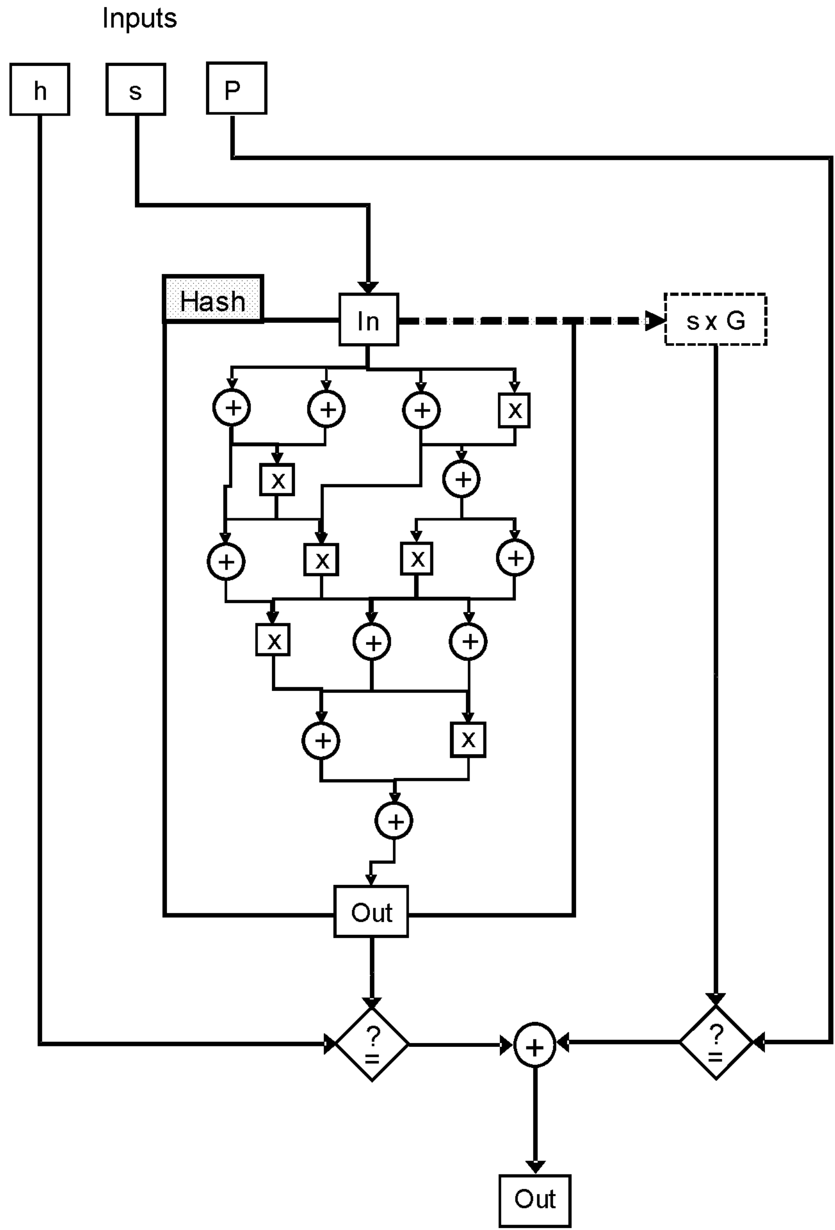
Figure 5:
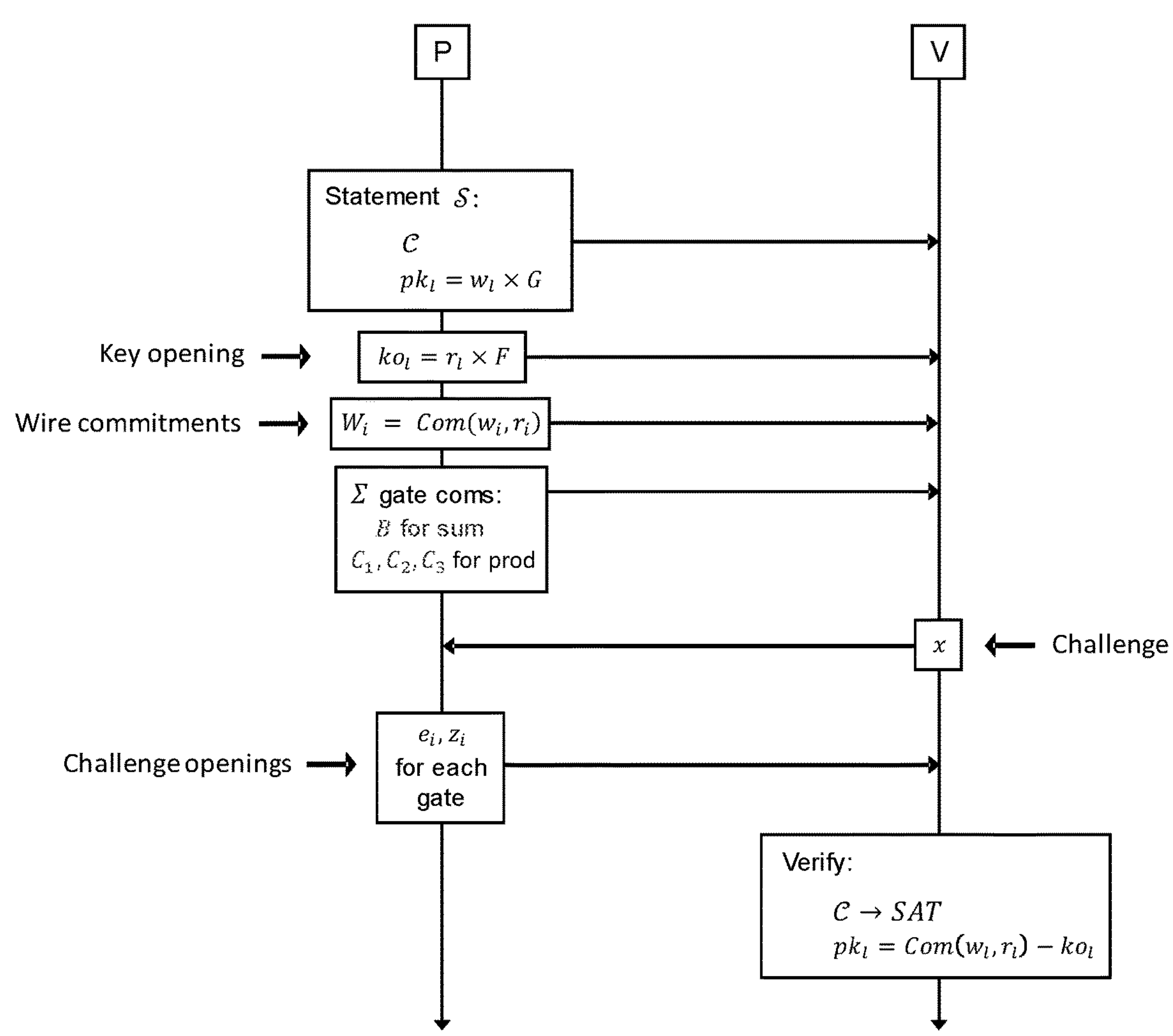
Figure 6:
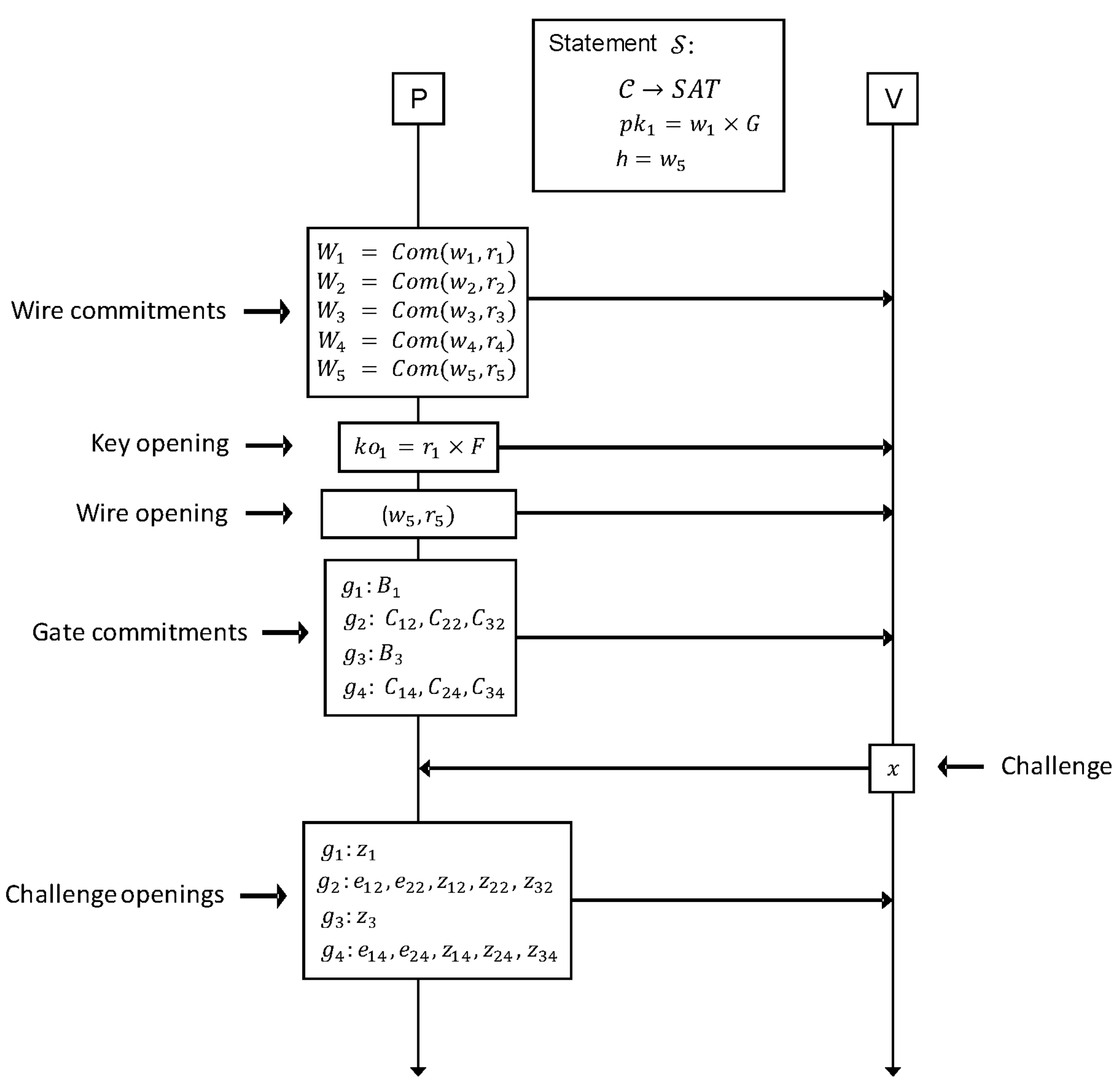

Aspects of the present invention will be apparent from and elucidated with reference to, the embodiment described herein. An embodiment of the present invention will now be described, by way of example only, and with reference to the accompany drawings, in which:

FIG. 2 is a schematic of a composite circuit for a statement, containing arithmetic circuits for a hash function and an elliptic curve multiplication;

FIG. 3 is an alternative schematic of an arithmetic circuit for the composite statement of FIG. 1, wherein only one arithmetic circuit is required;

FIG. 4 is a schematic of an arithmetic circuit having four gates and five wires, wherein a wire has its public key revealed or opened from a wire commitment with a key-opening value;

FIG. 5 is a schematic representation of the data exchanged between a prover and a verifier for the proof of a statement S, said statement having a circuit description and that the first wire has a corresponding public key;

FIG. 6 is an alternative schematic representation of the data exchanged between a prover and a verifier; and FIG. 7 is a schematic of the checks performed by a verifier to verify the circuit of FIG. 4 is satisfied, that an input wire has the required public key and that a hash of the output wire has the required value.

DETAILED DESCRIPTION

Overview

The invention enables an efficient zero knowledge verification of composite statements that involve both arithmetic circuit satisfiability and dependent statements about the validity of public keys (key-statement proofs) simultaneously. Public key elliptic curve specifications are employed within a homomorphic commitment function to prove circuit satisfiability. This enables the proof of public key statements corresponding to private keys used as circuit inputs and/or outputs in an efficient manner.

The proof size and computational expense of generating proofs for statements involving both circuit satisfiability and elliptic curve key pairs can be substantially reduced. The method herein can be easily incorporated into existing discrete-log based zero-knowledge proof protocols for circuit satisfiability which do not require the use of bilinear pairing-friendly elliptic curves. The method is fully compatible with the Bitcoin secp256k1 standard.

Two applications of the method that relate to fair-exchange transactions between two parties on a blockchain, such as the Bitcoin blockchain, are described. The first involves a zero-knowledge contingent payment for the trustless sale of an outsourced vanity address, which requires a zero-knowledge proof of the equality of a SHA256 hash preimage and an elliptic curve (e.g. Bitcoin) secret key. The second involves improving security on a cross-chain atomic swap, which requires a proof that a SHA256 hash pre-image is equal to unknown private key (with a supplied public key) multiplied by a supplied nonce.

General Solution

This invention concerns a method to enable the proof a particular class of composite statements that involve relationships with elliptic curve public/private key pairs (based on elliptic curve point multiplications).

Using zkSNARKs to prove statements that involve arbitrary cryptographic elliptic curve key operations is deemed impractical and, therefore, the method uses information on elliptic curve public keys that is extracted directly from the 'homomorphic hiding' (or commitment scheme) used in the construction of proofs for generic circuit satisfiability. The particular type of elliptic curve involved in the statement of the method is identical to that used in the circuit commitment scheme.

However, the SNARK method involves pairing operations and therefore requires special bilinear pairing-friendly elliptic curves. This precludes using zk-SNARKs because the elliptic curves used on some blockchains are not compatible with bilinear pairing-friendly elliptic curves.

By way of example, statements relating to Bitcoin public keys use the Bitcoin secp256k1 curve, which is not compatible.

The method of the invention, therefore, is compatible with alternative protocols for proving arithmetic circuit satisfiability that do not rely on pairings and have fewer cryptographic assumptions. Overall, the method of the invention is more efficient than zkSNARKS because fewer computations are required and the proof size is reduced for trustless exchange applications.

By way of example, the schematic of FIG. 2, which represents a composite circuit for 'Statement 1' below, contains sub-circuits for both a hash function and elliptic curve multiplication. In FIG. 2 the schematic has three inputs: a secret key 's' having a corresponding paired public key 'P' and a value 'h' which is a hash of the secret key 's'. The schematic contains two arithmetic circuits, wherein the first performs a hash on the secret key while the second performs an elliptic curve multiplication on the secret key. The outputs of the circuits are compared against the inputs.

Note that the internal gates are for illustrative purposes only. The circuit checks that the output of the hash is equal to the elliptic curve (EC) public key. Only the inputs 'h', 'P' and the output are fully revealed to the verifier. All other values are encrypted.

Statement 1

"Given a hash function (H) output h and an elliptic curve point P (the public key), the pre-image of the hash s (i.e. h=H(s))

is equal to the elliptic curve point multiplier (the private key, i.e. P=s×G, wherein G is the elliptic curve generator point)"

The method enables a prover to prove this particular statement in zero-knowledge. Examples of applications that benefit from such a method are described below in relation to the trust-less exchange of data (e.g. sale of outsourced bitcoin vanity addresses) and an anonymised and secure cross chain atomic swap.

The verification of the truth of statement 1 is determinable, by way of example, using the pseudo-code function below, which takes the inputs 'h', 'P' and 's' and outputs '1' if the statement is true and '0' otherwise:

```
int verify(h,P,s)
{
        if(h == H(s) && P == s x G)   {
                return 1
        }
        else {
                return 0
        }
}
```

Verifying 'Statement 1' in zero knowledge i.e. where the prover keeps the value of 's' secret from the verifier with the zkSNARK system would require arithmetic circuits for both the hash function AND the elliptic curve point multiplication, as per FIG. 2.

Although arithmetic circuits for the SHA-256 hash function are widely used and optimised, and typically contain less than 30,000 multiplication gates, there are no known examples of arithmetic circuits for cryptographic elliptic curve point multiplication implemented the literature. Even if such circuits were known they would be impractical because of their size and complexity and contain many more gates.

The method functions with a full arithmetic circuit for the single hash function, as shown in FIG. 2, that has a schematic of an arithmetic circuit for the composite Statement 1 employing a key-statement proof and just one arithmetic circuit for the hash function. The circuit checks that the output of the hash is correct and that the public key is equal to the EC encrypted input (a key-statement proof). The values highlighted in blue i.e. the inputs 'h', 'P', and outputs '1' are revealed to the verifier, all other values are encrypted.

Using the circuit of FIG. 3 a prover is able to explicitly prove via circuit satisfiability that a secret key 's' hashes to 'h', and the corresponding public key 'P' of the key pair is equal to 's×G', wherein G is an elliptic curve generator point. The secret key 's' is the pre-image of the hash, or input to the function, and not revealed to the verifier when proving the statement.

It should be noted that verifying that 's×G' is equal to 'P' can be extracted from the circuit proof at negligible extra computational cost by employing the required elliptic curve in a commitment scheme as part of the proof protocol. Such an operation is referred to a 'key-statement proof' and uses a commitment opening procedure referred to as a 'key-opening'.

Technical Effect

Known Zero-knowledge Succinct Non-interactive Arguments of Knowledge (zk-SNARKs) are an implementation of a general-purpose proof system for arithmetic circuit satisfiability. In the SNARK framework, a statement encoded as an arithmetic circuit is converted into a construct called a Quadratic Arithmetic Program (QAP), which consists of a set of polynomial equations. The statement can them be proved by demonstrating the validity of this set of equations at a single point. The main advantage of the SNARK method is that the verifier only needs to perform a few elliptic curve (pairing) operations (taking a few ms) and the proof is very small (288 bytes) and independent of the circuit size.

The very small proof and verification time achieved by the SNARK method comes at the expense of a trusted set-up, non-standard cryptographic assumptions and a much heavier computational burden placed upon the prover. The SNARK method also requires the use of elliptic curve bi-linear pairings. However, the use of computationally feasible bi-linear pairings requires the use of special 'pairing-friendly' elliptic curves. This precludes the use of many standard cryptographic elliptic curve parameter sets, including the Bitcoin secp256k1. Statements involving general elliptic curve point-multiplications must then employ explicit circuits (which may be very large).

By way of comparison with the Σ protocol approach to proving SHA circuit satisfiability described in the previous section, with the SNARK (Pinocchio) framework, the proving key would take approximately 10 seconds to generate and be approximately 7 MB in size, and the proof would also take approximately 10 second to generate. The proof size would however be 288 B and only take approximately 5 ms to verify[Bootle 2016].

Additionally incorporating an explicit elliptic curve multiplication (key-statement) into the circuit, would multiply both the proving key size and proof generation time by at least an order of magnitude.

The invention enables the zero-knowledge proof of statements that involve elliptic curve public-private key relationships simultaneously with general arithmetic circuit satisfiability. This is achieved with negligible computational expense beyond proving satisfiability of the arithmetic circuit, and avoids the requirement of creating explicit arithmetic circuits for elliptic curve point multiplication operations which would increase the computational expense of the proof substantially.

Implementation

The implementation of the invention is described below for both batched and un-batched commitment based zero-knowledge proof systems.

In the examples, two parties are involved in the zero-knowledge proof protocol: the prover (P) and the verifier (V). The purpose of the protocol is for the prover to convince the verifier that a given statement ($\mathcal{S}$) is true, while keeping information about the witness to the statement secret. The statement consists of an arithmetic circuit ($\mathcal{C}$) with m gates and n wires, as well as dependent assertions about the elliptic curve public key(s) corresponding to one (or more) of the circuit wire values: $pk_l$, where the sub-script l is the wire index of the key statement. In addition, the statement may also include assertions about fully opened (public) wire values (i.e. public inputs/outputs of the circuit).

The elliptic curve public key(s) specified in the statement correspond to a target elliptic curve specification (which is defined by the full set of elliptic curve parameters:

$$\mathcal{T} = (p, a, b, G, n, h)).$$

In the case of Bitcoin script, these parameters are defined by the specification of secp256k1[SEC 2010]. This specification includes the base generator point G. In addition to the specifying the base point, the statement must also specify a second point F (where $F=f\times G$ and f is an element of $\mathbb{Z}_p$). The value of f must be provably random (e.g. the Bitcoin genesis block hash), or a 'nothing up my sleeve' number, such as the first 256 bits of the binary representation of $\pi$ because allowing the prover a free choice over f could enable them to generate fake proofs.

Batched and unbatched commitments are described in relation to FIG. 4, which is a representative arithmetic circuit having four gates and five wires. Input wire ($w_1$) has it's public key revealed, or opened, from the wire commitment $W_1$ with the 'key-opening' value $ko_1$ Implementation—Individual Wire Commitments Using FIG. 4 as an example, 'key openings' are individual commitments to each wire in the circuit that are created by the prover and sent to the verifier. These key openings follow known $\Sigma$ protocols for arithmetic circuit satisfiability. FIG. 5 illustrates the data exchanged between the prover and verifier.

Satisfiability is achieved by including a number of steps, as follows:

1. Each wire i (i=1, . . . , n) of the circuit is committed to with a Pedersen commitment:

$$W_i = Com(w_i, r_i)$$

Where:

$$Com(w, r) = w\times G + r\times F$$

2. For the circuit wire l that requires a proof of its corresponding public key (a key-statement proof), the prover also sends a key-opening:

$$ko_l = r_l\times F$$

3. Optionally, if a circuit wire j requires being publically revealed (a fully public wire), the prover sends the full opening tuple:

$$(w_j, r_j)$$

4. Each gate of the circuit is then proven satisfied in zero knowledge using the $\Sigma$ protocols, which involves the prover computing and sending the $\Sigma_{zero}$ and $\Sigma_{prod}$ commitments (i.e. B or $C_1$, $C_2$, $C_3$ respectively) for each gate, and the verifier replying with a challenge value (x), the prover then sending the opening values (z and e values) and the verifier checking against the commitments.
5. Once the verifier has confirmed that the circuit is satisfied, the verifier then calculates the public key for the wire l via elliptic curve point subtraction:

$$pk_l = Com(w_l, r_l) - ko_l$$

6. The verifier then confirms that each $pk_l$ matches the key(s) specified in the statement (and that the fully opened wires match specified values) to complete the validation.

Implementation in Detail—Individual Wire Commitments

Continuing with FIG. 4, an explicit example detailing the individual commitments and validations of the example is provided which describes verifying the satisfiability of a simple arithmetic circuit with both a key-statement proof of one of the wires and a full revealing of another wire.

The circuit $\mathcal{C}$ as shown in FIG. 4 has 5 wires $w_i$ (i=1, . . . ,5) and 4 gates $g_j$ (j=1, . . . ,4). Gates 1 and 3 are addition gates and gates 2 and 4 are multiplication gates.

The prover and verifier agree on the statement, which includes the circuit, the value of wire 5 and the public key of wire 1, along with the elliptic curve and commitment specification. The statement ($\mathcal{S}$) the prover wants to prove the truth of to the verifier is:

"I know a satisfying assignment to the circuit $\mathcal{C}$ (i.e. wire values $$\{w_i\}_{i=1}^{5}$$

that satisfy all the gates), where wire 1 has a public key P (i.e. $P=w_1\times G$) and wire 5 has a value h (i.e. $w_n=h$)."

The values of wires 1 to 4 are not revealed. The prover and verifier then interact as shown in FIG. 6, and as described below:

1. The prover generates 5 random blinding values ($r_1$, . . . , $r_5$) and then calculates the 5 wire commitments ($W_1$, . . . , $W_5$) and sends these to the verifier.
2. The prover computes the key opening for wire 1: $ko_1=r_1\times F$ and sends it to the verifier.

3. The prover sends the full opening information for wire 5 ($w_5$, $r_5$) to the verifier.
4. For the addition gates ($g_1$ and $g_3$) the prover generates a commitment to zero (with a random nonces $r_{B1}$ and $r_{B3}$): $B_1=Com(0, r_{B1})$ and $B_3=Com(0, r_{B3})$ and sends them to the verifier.
5. For the multiplication gates ($g_2$ and $g_4$) the prover generates the commitments as follows:

$$\text{For gate 2: } C_{12} = Com(t_{12}, t_{32}),\ C_2 = Com(t_{22}, t_{52}) \text{ and}$$

$$C_3 = t_{12} \times W_1 + t_{42} \times F$$

$$\text{For gate 4: } C_{14} = Com(t_{14}, t_{34}),\ C_2 = Com(t_{24}, t_{54}) \text{ and}$$

$$C_3 = t_{14} \times W_3 + t_{44} \times F$$

Where the $t_{xx}$ values are random blinding nonces. The prover sends these commitments to the verifier.

6. The verifier then generates a random challenge value x, and sends it to the prover. Alternatively, the prover can generate value x by hashing a concatenation of all the commitments, using the Fiat-Shamir heuristic.
7. For the addition gates ($g_1$ and $g_3$) the prover computes the following openings and sends them to the verifier:

$$z_1 = x(r_1 + r_1 - r_2) + r_{B1}$$

$$z_3 = x(r_2 + r_1 - r_4) + r_{B3}$$

8. For the multiplication gates ($g_2$ and $g_4$) the prover computes the following openings and sends them to the verifier:

$$e_{12} = w_1 x + t_{12}$$

$$e_{22} = w_2 x + t_{22}$$

$$z_{12} = r_1 x + t_{32}$$

$$z_{22} = r_2 x + t_{52}$$

$$z_{32} = (r_3 - w_1 r_2)x + t_{42}$$

$$e_{14} = w_3 x + t_{14}$$

$$e_{24} = w_4 x + t_{24}$$

$$z_{14} = r_3 x + t_{34}$$

$$z_{24} = r_4 x + t_{54}$$

$$z_{34} = (r_5 - w_3 r_4)x + t_{44}$$

9. Finally, the verifier checks the equalities. If these pass, then the proof is verified.

The verification performed by the verifier is outlined in FIG. 7, wherein the checks in the inner-box verify that the circuit is satisfied, and that the first wire has the required public key and that wire 5 has the required value.

The challenge 'x' in FIGS. 5 and 6 provides for an interactive proof, wherein communications are passed back-and-forth between the prover and the verifier.

This interaction can be inconvenient when a zero-knowledge contingent payment (ZKCP) takes place because the seller and buyer might not be available, or on-line, at the same time. Moreover, the buyer (verifier) may wish for a proof to be publically verifiable e.g. it may be part of an advertisement for the digital goods.

In addition, the proofs are only strictly zero-knowledge in the perfect special-honest verifier model: that is, it is assumed the verifier generates a genuine random number as the challenge, and does not choose the challenge value to try and extract information about the witness.

To solve these problems, the Fiat-Shamir heuristic is applied, which replaces the random challenge value 'x' with the output of a hash of the commitments made by the prover. In the random oracle model (where the output of a cryptographic hash function is considered truly random), the prover cannot cheat, and the verifier can check the challenge value generated.

The example can be improved, therefore, by using the Fiat-Shamir heuristic to convert an interactive proof system into a non-interactive one, and the prover can generate a proof that can be independently and publically verified, off-line.

More specifically, the challenge value (x) is replaced with a value computed by hashing (with for example SHA-256) the concatenation of all of the commitments generated by the prover (i.e. all of the wire commitments and all of the B and $C_1$, $C_2$, $C_3$ commitments for sum and product gates respectively).

Implementation—Batched Vector Commitments

Compressed proof systems for circuit satisfiability that involve the batching of vector commitments[*Bootle* 2016, *Groth* 2009] use the method described below, wherein the method enables the extraction of key-statement proofs from batched circuit wire commitments.

The full process is not described to avoid repetition, and the steps below focus on the generation of the batched wire commitment and demonstrating it contains a specified public key. In the steps below, a batched commitment is generated as follows, where the wire 1 is to be supplied with a key opening–n wires are batched together in the vector commitment.

1. The prover generates n−1 random numbers $x_1, \ldots, x_{n-1} \leftarrow \mathbb{Z}_p$.
2. The prover computes the elliptic curve points $K_i=x_i \times G$ (for i=1, . . . , n−1). These values plus $K_n=G$ form a proving key PrK that is sent to the verifier.
3. The prover generates a random value: $r \leftarrow \mathbb{Z}_p$.
4. The prover computes the commitment to the vector w of wire values $w_i$ (for i=1, . . . , n) where $w_n$ is to be key-opened:

$$Com(w) = r \times F + \sum_{i=1}^{n-1} w_i \times K_i + w_n \times G$$

and sends it to the verifier.

5. The prover also sends the key opening for the vector commit:

$$ko_n = r \times F + \sum_{i=1}^{n-1} w_i \times K_i$$

6. The verifier calculates the public key opening of the key-statement wire, via elliptic curve arithmetic:

$$pk_n = Com(w) - ko_n$$

Invention Overview

The proof of equivalence of a hash pre-image and elliptic curve private key can be utilised in numerous applications. Two applications are described below, which outline the construction of a specific example of a key-statement zero-knowledge proof for utilisation.

The statement $\mathcal{S}$ below is, for the purposes of the example applications, a more specific version of Statement 1 described above, wherein.

$\mathcal{S}$:

"Given a SHA-256 hash function (H) with a public output h and a public point P on the secp256k1 elliptic curve, the secret pre-image of the hash, s (i.e. h=H(s))

is equal to the elliptic curve point multiplier (i.e. the corresponding private key, i.e. P=s×G)"

In the examples provided, this statement consists of a single arithmetic circuit for the SHA-256 hash function $\mathcal{C}_{SHA256}$ (with n wires $w_i$ (i=1, . . . , n) and m gates) along with an assertion that the input wire ($w_1$) is the private key for public point P and that the output wire ($w_n$) is equal to h. i.e.:

$$\mathcal{S}: \mathcal{C}_{SHA256} \text{ is satisfied by the wires}$$

$$\{w_i\}_{i=1}^{n} \text{ AND } w_1 \times G = P \text{ AND } w_n$$

Therefore, to fully verify this statement, the prover must demonstrate to the verifier that they know a satisfying assignment to the SHA256 circuit using the secp256k1 based commitment scheme, and then simply provide the key-opening for wire 1 ($ko_1$) and the full opening for wire n ($w_n$, $r_n$). The verifier does not learn the value of the input wire ($w_1$), or the values of any of the other wires except for the fully opened output wire $w_n$.

Application I

Examples of the invention, as described in the implementation sections above, can be applied to a ZKCP for an outsourced bitcoin vanity address, which represents data to be exchanged for a payment, or access to a resource.

Bitcoin addresses are encoded in a human readable alphanumeric format (Base58 encoding) in order to make them easy to publish, copy and transcribe. The use of this format has led to the popularity of so-called vanity addresses, where the key space is brute-force searched in order to find a private key that results an address that contains a desired string (like a name), such as the one shown below.

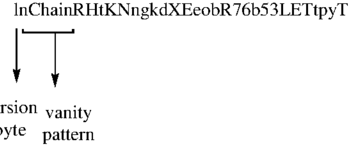

Since deriving a vanity address with a significant pattern can be computationally expensive (for example, the address shown above required the generation of approximately $10^{13}$ different public keys before a match was found) it is common for the search to be outsourced, and there are several online marketplaces where vanity addresses are commissioned and sold. This can be done securely using the homomorphic properties of elliptic curve point multiplication[JoelKatz 2012].

Although outsourcing the generation is secure, the sale of the vanity address is not trustless. Either the buyer gets the required value before the seller gets paid, or the seller gets paid before releasing the required value, or they must both trust an escrow service. The invention can be employed to enable the trustless sale of a vanity address via a ZKCP. The steps taken between the buyer/verifier and the seller/prover are described below.

1. The buyer and seller agree on the required vanity pattern (Str) and the price (a Bitcoin), and establish a communication channel, which does not need to be secure.
2. The buyer generates a secure random secret key $sk_B$ and corresponding elliptic curve public key, wherein the public key $pk_B=sk_B \times G$.
3. The buyer sends $pk_B$ to the seller.
4. The seller then performs a search for the required pattern in the Base58 encoded address derived from $pk=pk_B+i \times G$ by changing i.
5. When an address with the required pattern is found, the seller saves the value i, signals to the buyer and sends them $pk_s=i \times G$ and the SHA256 hash H(i).
6. The seller also provides a proof to the buyer that the pre-image to H (i) is the private key corresponding to $pk_s$, as described in the examples above.
7. The buyer verifies the proof, and also confirms that the address corresponding to $pk=pk_B+pk_s$ matches the agreed pattern. At this point (by virtue of the proof), the buyer knows that learning the value i will enable them derive the full private key for the vanity address ($sk_B$+i), and that the particular value i hashes to h=H(i).
8. The buyer then constructs a hash-time-locked contract (HTLC) transaction $Tx_1$ which contains an output that contains the agreed fee (a). This output can be unlocked in two ways:
   i. With a signature from the seller and the hash pre-image, i, at any time; and
   ii. With a signature from the buyer after a specified time, using, for example, the CHECKLOCKTIME-VERIFY (OP_CLTV) script op code, which can be used to prevent an output from being spent until a specified time or block height.
9. The buyer then signs and broadcasts this transaction to the blockchain, where it is mined into a block.
10. Once confirmed, the seller can claim the fee in the output of $Tx_1$ by providing a transaction $Tx_2$ supplying their signature and the value i to unlock the hash-lock, which is then revealed on the blockchain.
11. The buyer can calculate the final vanity address private key $sk=sk_B$+i, where $pk=sk \times G$.
12. If the buyer fails to supply the value i before a specified OP_CLTV time, then the seller can provide their signature to re-claim the fee (to prevent the fee being lost due to an un-cooperative buyer).

The transaction is then fully atomic and trustless: the buyer only gets paid if they provide a valid value i which is revealed publically on the blockchain. Due to the splitting of the private key, this value is of no use to anyone else and does not compromise the security of the full private key.

Application II

Examples of the invention, as described in the implementation sections above, can be applied to a private exchange of data between two parties, each having their respective data to be swapped registered on different blockchains.

More specifically, the invention can be applied to a privacy preserving cross-chain atomic swap, which is a trustless fair-exchange protocol that leverages blockchain transaction features–also known as an atomic trade. The protocol is used to trade two different cryptocurrency tokens on two different blockchains without a third party centralised exchange. The word 'atomic' in this context refers to the fair exchange property: either the both parties complete their transactions or neither do.

An example of a known basic protocol is executed as per the steps below. To be secure, both of the cryptocurrencies used in the swap must have scripting functionality that enables hashed and time-locked contracts. The swap involves two parties: Alice and Bob. In this example, Alice has 1 Bitcoin and has agreed to trade it for Bob's 100 Litecoins.

1. Alice generates a Litecoin public key $P_A$ which she sends to Bob.
2. Bob generates a Bitcoin public key $P_B$ which he sends to Alice.
3. Alice generates a secure random number x.
4. Alice computes the SHA-256 hash of x: h=H (x).
5. Alice creates a Bitcoin transaction $Tx_A$ which:
   i. Pays 1 Bitcoin to $P_B$ with a valid signature AND a value that hashes to h
   ii. OR pays 1 Bitcoin back to Alice after 24 hours.
6. Alice broadcasts the transaction to the Bitcoin network.
7. Once Bob observes $Tx_4$ is confirmed on the Bitcoin blockchain, he creates a Litecoin transaction $Tx_B$ which:
   i. Pays 100 Litecoin to $P_A$ with a valid signature AND a value that hashes to h
   ii. OR pays 100 Litecoin back to Bob after 24 hours.
8. Bob broadcasts the transaction to the Litecoin network.
9. Once the transaction has confirmed, Alice can then claim the Litecoin output by providing her signature and the value x.
10. Once Bob observes the value x on the Litecoin blockchain and can then claim the Bitcoin output by providing his signature and the value x.

This example ensures that either both parties get their coins, or neither do. Alice generates the hash value and only she knows the pre-image, but she is required to reveal this pre-image to claim the coins, which then enables Bob to claim his coins. If either party does not follow the protocol to completion, both of them can re-claim their coins after a lock-out period.

One significant disadvantage feature of the known protocol described above is that the transactions on both blockchains are trivially linkable: once confirmed, the unique value x is publically visible on both blockchains, forever. This affects both the fungibility of the coins and the privacy of the transaction.

In order to un-link the two transactions, different keys must be used for the outputs on each chain, but in order for the protocol to be secure and trustless, Bob must be given a proof by Alice that he will learn the information needed to unlock his coin when she reveals her hash pre-image.

By employing the key-statement proof described in the examples above, the hash-locked output on the second blockchain can be converted to a normal pay-to-public-key-hash (P2PKH) output, both disguising the nature of the transaction and breaking any possible link.

Applied to the example above in which Alice has 1 Bitcoin and has agreed to trade it for Bob's 100 Litecoins, the improved process would include the actions below:

2. Alice generates a Litecoin public key $P_A$ (with private key $s_A$) which she sends to Bob.
3. Bob generates a Bitcoin public key $P_B$ (with private key $s_B$) which he sends to Alice.
4. Alice generates a secure random number $x \leftarrow \mathbb{Z}_p$.
5. Alice computes the SHA-256 hash of x: h=H(x) and an elliptic curve public key corresponding to x: $P_x = x \times G$.
6. Alice securely sends both h and $P_x$ to Bob.
7. Alice also sends a key-statement proof to Bob that the pre-image of h is equal to the private key that generated $P_x$.
8. Alice creates a Bitcoin transaction $Tx_A$ which:
   i. Pays 1 Bitcoin to public key $P_C = P_B + P_x$
   ii. OR pays 1 Bitcoin back to Alice after 24 hours.
9. Alice broadcasts the transaction to the Bitcoin network.
10. Once Bob observes $Tx_A$ is confirmed on the Bitcoin blockchain, he creates a Litecoin transaction $Tx_B$ which:
   i. Pays 100 Litecoin to $P_A$ with a valid signature AND a value that SHA-256 hashes to h
   ii. OR pays 100 Litecoin back to Bob after 24 hours.
11. Bob broadcasts the transaction to the Litecoin network.
12. Once the transaction has confirmed, Alice can then claim the Litecoin output by providing her signature and the value x.
13. Once Bob observes the value x on the Litecoin blockchain and can then claim the Bitcoin output by providing a signature using the private key for $P_C$, which is $s_B + x$ from the homomorphic properties of elliptic curve point multiplication.

Applications in General

The invention is suited to zero-knowledge proof or verification of a statement (S) in which a prover proves to a verifier that a statement is true while keeping a witness (w) to the statement a secret. The secret can be processed by a function, such as a hash function, but additionally include cryptographic elliptic curve key operations, for example the validity of statements regarding public keys. In an example above the method of the invention has been used to enable a trustless ZKCP for a vanity address. This can also be applied to, for example: the derivation of a password; the verification of a valid machine-readable document, such as a passport or identify card; or other such confidential transactions.

It should be noted that the above-mentioned embodiments illustrate rather than limit the invention, and that those skilled in the art will be capable of designing many alternative embodiments without departing from the scope of the invention as defined by the appended claims.

In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of".

The singular reference of an element does not exclude the plural reference of such elements and vice-versa. The invention may be implemented by means of hardware comprising several distinct elements, and by means of a suitably programmed computer.

In a device claim enumerating several means, several of these means may be embodied by one and the same item of hardware. The mere fact that certain measures are recited in mutually different dependent claims does not indicate that a combination of these measures cannot be used to advantage.

REFERENCES

[Campanelli 2017] Campanelli, Matteo, et al. "Zero-knowledge contingent payments revisited: Attacks and payments for services." Commun. ACM (2017).

[Maxwell 2016] https://github.com/zcash-hackworks/pay-to-sudoku

[Parno 2016] Parno, Bryan, et al. "Pinocchio: Nearly practical verifiable computation." Security and Privacy (SP), 2013 IEEE Symposium on. IEEE, 2013.

[Libsnark 2016] https://github.com/scipr-lab/libsnark

[Bootle 2016] BOOTLE et al., "Efficient zero-knowledge proof systems." Foundations of Security Analysis and Design, Aug. 14, 2016, 32 pages.

[Groth 2009] Groth, Jens. "Linear Algebra with Sub-linear Zero-Knowledge Arguments." CRYPTO. Vol. 5677. 2009.

[JoelKatz 2012] https://bitcointalk.org/index.php?topic=81865.msg901491 #msg901491

[Bootle 2016] Bootle, Jonathan, et al. "Efficient zero-knowledge arguments for arithmetic circuits in the discrete log setting." Annual International Conference on the Theory and Applications of Cryptographic Techniques. Springer, Berlin, Heidelberg, 2016.

[SEC 2010] Standards for Efficient Cryptography (SEC) (Certicom Research, http://www.secg.org/sec2-v2.pd A Bitcoin Developer Reference is retrievable from http://bitcoin.org/en/developer-reference.

What is claimed is:

1. A computer-implemented method executed by a computing device associated with a seller or prover for enabling a trustless zero-knowledge contingent payment or exchange of reward data from a buyer or verifier in exchange for access data from the seller or prover, wherein the reward data is data associated with a payment, the method including:

receiving from the buyer a buyer public key ($pk_B$) derived from multiplying a buyer secret key ($sk_B$) with an elliptic curve generator point (G), wherein the elliptic curve generator point (G) is defined on an elliptic curve and is selected from elliptic curves used in blockchain network cryptographic operations;

generating a seller public key ($pk_s$) determined from multiplying a seller secret key (i) with the elliptic curve generator point (G), wherein the seller secret key is the access data or is used to secure the access data required by the buyer;

generating a zero-knowledge proof statement using a Sigma protocol with batched wire commitments for an arithmetic circuit representing the zero-knowledge proof statement, wherein the zero-knowledge proof statement uses publicly verifiable elliptic curve parameters with a prover-generated proving key computed from random numbers, which for a function circuit output of an arithmetic circuit representing the zero-knowledge proof statement, and an elliptic curve point, an input of the function circuit is equal to the seller secret key (i), wherein said zero-knowledge proof statement enables the buyer to determine that the arithmetic circuit is satisfied and validate the zero-knowledge proof statement through verification of the batched wire commitments, thus determining that the seller holds the required seller secret key that unlocks the access data;

preparing and sending a data set to the buyer, the data set including the zero-knowledge proof statement and a hash value computed by applying a hash function to the seller secret key (i);

receiving from the buyer a first transaction $Tx_1$ that contains an output including a hash-locked output script that specifies a hash value computed by applying a hash function to the seller secret key that allocates the reward data to the buyer, which is accessible using the seller secret key (i) as a preimage to the hash value specified in the hash-locked output script;

responsive to observing the first transaction $Tx_1$ being broadcast on a blockchain, such that the first transaction $Tx_1$ is mined into a block by distributed blockchain nodes, accessing the reward data from the output of the first transaction $Tx_1$; and generating, signing and broadcasting a second transaction $Tx_2$ that includes a digital signature from the seller or prover and the seller secret key (i) in plaintext form as the preimage to satisfy the hash-locked output script to unlock the reward data, wherein the seller secret key (i) is revealed on the blockchain through publicly recorded inclusion of the plaintext seller secret key in an input script of the second transaction $Tx_2$ that is stored in a subsequent block on the blockchain, thus enabling the buyer to retrieve the seller secret key (i) by reading the input script of the second transaction $Tx_2$ from the blockchain and to obtain the access data offered by the seller by deriving the access data from the retrieved seller secret key (i).

2. A computer-implemented method executed by a computing device associated with a buyer or verifier for enabling a trustless zero-knowledge contingent payment or exchange of reward data from a buyer or verifier in exchange for access data from a seller or prover, wherein the reward data is data associated with a payment, the method including:

sending the seller a buyer public key ($pk_B$) derived from multiplying a buyer secret key ($sk_B$) with an elliptic curve generator point (G), wherein the elliptic curve generator point (G) is defined on an elliptic curve and is selected from elliptic curves used in blockchain network cryptographic operations;

receiving from the seller a data set, the data set including a zero-knowledge proof statement using a Sigma protocol with batched wire commitments for an arithmetic circuit representing the zero-knowledge proof statement, wherein the zero-knowledge proof statement uses publicly verifiable elliptic curve parameters with a prover-generated proving key computed from random numbers, which for a function circuit output of an arithmetic circuit representing the statement, and an elliptic curve point, an input of the function circuit input is equal to a seller secret key (i), wherein a seller's public key ($pk_s$) is derived from multiplying the seller secret key (i) with the elliptic curve generator point (G), wherein the seller secret key is the access data or is used to secure the access data, wherein said zero-knowledge proof statement enables the buyer to determine that the arithmetic circuit is satisfied and validate the zero-knowledge proof statement through verification of the batched wire commitments, thus determining that the seller holds the seller secret key (i) required for unlocking the access data;

receiving from the seller the data set including the zero-knowledge proof statement and a hash value computed by applying a hash function to the seller secret key (i);

verifying the zero-knowledge proof statement;

generating, signing and broadcasting a first transaction $Tx_1$, which contains an output including a hash-locked output script that specifies a hash value computed by applying a hash function to the seller secret key that allocates the reward data to the buyer in exchange for obtaining the access data, which is accessible using the seller secret key (i) as a preimage to the hash value specified in the hash-locked output script;

monitoring on a blockchain, for an indication that the seller has signed and broadcasted a second transaction that includes a digital signature from the seller or prover and the seller secret key (i) in plaintext form as the preimage to satisfy the hash-locked output script to unlock the reward data from the output of the first transaction, wherein the seller secret key (i) is revealed on the blockchain through publicly recorded inclusion of the plaintext seller secret key in the input script of the second transaction that is stored in a subsequent block on the blockchain;

retrieve the seller secret key (i) by reading the input script of the second transaction from the blockchain; and obtaining the access data offered by the seller by deriving the access data from the retrieved seller secret key (i).

3. The computer-implemented method according to claim 1, wherein the access data to be provided by the seller is a secret key of a vanity address or enables the determination of a secret key of a vanity address.

4. The computer-implemented method according to claim 1, for enabling zero-knowledge proof or verification of a statement (S) in which a prover proves to a verifier that a statement is true while keeping a witness (w) to the statement a secret, the method including:

the prover sending to the verifier:

a statement (S) represented by an arithmetic circuit with m gates and n wires configured to implement a function circuit and determine whether for a given function circuit output (h) and an elliptic curve point (P), the function circuit input (s) to a wire of the function circuit is equal to the corresponding elliptic curve point multiplier (s);

individual wire commitments and/or a batched commitment for wires of the arithmetic circuit;

a function circuit output (h); and a proving key (PrK), which enables the verifier to determine that the arithmetic circuit is satisfied and calculate the elliptic curve point (P) and validate the statement, thus determining that the prover holds the witness (w) to the statement.

5. The computer-implemented method according to claim 4, wherein the prover sends an individual wire commitment and communicates with the verifier using the sigma protocol to prove knowledge of the witness (W).

6. The computer-implemented method according to claim 4, wherein the prover receives from the verifier a challenge value (x) and responds with an opening.

7. The computer-implemented method according to claim 4, wherein the prover sends to the verifier a random value (x) for enabling the verifier to determine that the statement is true and calculate the elliptic curve point (P).

8. The computer-implemented method according to claim 7, wherein the random value (x) is computed by hashing the concatenation of all the individual wire commitments generated and sent to the verifier by the prover.

9. The computer-implemented method according to claim 4, wherein the commitment $W_i$ is:

$$W_i = Com(w_i, r_i)$$

wherein:

Com is the commitment to the function circuit, $w_i$ is the wire value, $r_i$ is a random number—different for each wire commitment, and i is the wire denomination, such that $$Com(w, r) = w \times G + r \times F$$

wherein:

F and G are elliptic curve points.

10. The computer-implemented method according to claim 9, wherein an input to a wire l in the arithmetic circuit is:

$$ko = r_1 \times F,$$

wherein:

ko is a key-opening input, n is a random number, and

F is a point on an elliptic curve.

11. The computer-implemented method according to claim 10, wherein the verifier confirms that the circuit is satisfied, and is able to calculate the public key for the wire l via elliptic curve point subtraction:

$$pk_l = Com(w_l, r_l) - ko_l.$$

12. The computer-implemented method according to claim 4, wherein the prover sends a batch of wire commitments and generates random numbers to compute elliptic curve points for each wire to form the proving key (PrK).

13. The computer-implemented method according to claim 12, wherein the batched commitment for the witness is:

$$Com(w) = r \times F + \sum_{i=1}^{n-1} w_i \times K_i + w_n \times G$$

wherein:

r is a random number generated by the prover, the prover computes the commitment to a vector w of wire values $w_i$ (for i=1, . . . , n) where $w_n$ is to be a key-opened, $K_i$ are computed elliptic curve points, F is a point on an elliptic curve, and G is an elliptic curve generator point.

14. The computer-implemented method according to claim 13, wherein an input for the wire n in the arithmetic circuit is:

$$ko_n = r \times F + \sum_{i=1}^{n-1} w_i \times K_i$$

wherein:

$ko_n$ is a key-opening input, r is a random number, and

F is a point on the elliptic curve.

15. The computer-implemented method according to claim 14, wherein the verifier calculates a public key opening of the key-statement wire, via elliptic curve arithmetic:

$$pk_n = Com(w) - ko_n.$$

16. The computer-implemented method according to claim 1, wherein the prover additionally sends a fully opened commitment as an input to at least one wire of the function circuit of the arithmetic circuit.

17. The computer-implemented method according to claim 1, wherein the function circuit implements a hash function and, preferably, an SHA-256 hash function.

18. A non-transitory computer-readable storage medium comprising computer-executable instructions that, when executed, configure a processor to perform the method of claim 1.

19. An electronic device comprising:

an interface device;

one or more processor(s) coupled to the interface device; and a memory coupled to the one or more processor(s), the memory having stored thereon computer executable instructions that, when executed, configure the one or more processor(s) to perform the method of claim 1.

20. A node of a blockchain network, a node configured to perform the method of claim 1.

21. A blockchain network having the node according to claim 20.

22. The computer-implemented method of claim 1, wherein the distributed blockchain nodes validate the second transaction $Tx_2$ by executing verification that confirms a hash of the seller secret key (i) supplied in the input script of the second transaction $Tx_2$ matches the hash value specified in the hash-locked output script of the first transaction $Tx_1$.

* * * * *